United States Patent
Nishizawa et al.

(10) Patent No.: US 9,890,719 B2
(45) Date of Patent: Feb. 13, 2018

(54) CONTROL APPARATUS AND CONTROL METHOD FOR DIESEL ENGINE

(71) Applicant: NISSAN MOTOR CO., LTD., Yokohama-shi, Kanagawa (JP)

(72) Inventors: Toru Nishizawa, Kanagawa (JP); Shuichi Iio, Kanagawa (JP); Kiyoshi Ohga, Kanagawa (JP); Ryota Nakayama, Kanagawa (JP); Takashi Yamazaki, Kanagawa (JP); Yoshihiro Imaoka, Kanagawa (JP); Yasushi Ohmura, Tokyo (JP); Isshou Uehara, Kanagawa (JP); Masahiko Nakano, Tokyo (JP); Manabu Hasegawa, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 76 days.

(21) Appl. No.: 14/384,194

(22) PCT Filed: Mar. 13, 2013

(86) PCT No.: PCT/JP2013/057014
§ 371 (c)(1),
(2) Date: Sep. 10, 2014

(87) PCT Pub. No.: WO2013/137320
PCT Pub. Date: Sep. 19, 2013

(65) Prior Publication Data
US 2015/0083071 A1 Mar. 26, 2015

(30) Foreign Application Priority Data

Mar. 14, 2012 (JP) .................... 2012-057713

(51) Int. Cl.
*F02D 28/00* (2006.01)
*F02D 41/00* (2006.01)
(Continued)

(52) U.S. Cl.
CPC ......... *F02D 41/0007* (2013.01); *F02D 23/00* (2013.01); *F02D 23/02* (2013.01);
(Continued)

(58) Field of Classification Search
CPC ...... F02D 41/0007; F02D 23/02; F02D 41/14; F02D 41/08; F02D 41/086; F02D 41/064; F02D 23/00; F02D 2200/021; F02P 19/025; F02P 19/02; Y02T 10/144; F02B 37/24
USPC ......... 123/559.1, 169 R, 27 R; 701/102, 105
See application file for complete search history.

(56) References Cited

U.S. PATENT DOCUMENTS 4,197,711 A 4/1980 Fuhrmann et al.
4,512,307 A 4/1985 Igashira et al.
(Continued)

FOREIGN PATENT DOCUMENTS

EP 1 031 713 A1 8/2000
EP 1 081 353 A1 3/2001
(Continued)

*Primary Examiner* — Marguerite McMahon
(74) *Attorney, Agent, or Firm* — Drinker Biddle & Reath LLP

(57) ABSTRACT

A control apparatus for a diesel engine includes a neighboring temperature estimating section which estimates a temperature of a neighborhood of a glow plug that heats an interior of a cylinder upon startup, and a supercharging pressure control section which controls a supercharging pressure in such a way that a rotation fluctuation of the engine does not increase, on the basis of the estimated temperature of the neighborhood of the glow plug.

4 Claims, 19 Drawing Sheets

(51) Int. Cl.
*F02P 19/02* (2006.01)
*F02D 23/00* (2006.01)
*F02D 41/06* (2006.01)
*F02D 41/08* (2006.01)
*F02D 41/14* (2006.01)
*F02D 23/02* (2006.01)
*F02B 37/24* (2006.01)
*F02D 35/02* (2006.01)

(52) U.S. Cl.
CPC ........... *F02D 41/064* (2013.01); *F02D 41/08* (2013.01); *F02D 41/086* (2013.01); *F02D 41/14* (2013.01); *F02D 41/1401* (2013.01); *F02P 19/02* (2013.01); *F02P 19/025* (2013.01); *F02B 37/24* (2013.01); *F02D 35/026* (2013.01); *F02D 2041/1437* (2013.01); *F02D 2200/021* (2013.01); *F02D 2200/0406* (2013.01); *F02D 2200/0414* (2013.01); *Y02T 10/144* (2013.01)

(56) References Cited

U.S. PATENT DOCUMENTS 6,260,545 B1* 7/2001 Suzuki ................ F02B 33/443
123/550

2004/0123589 A1* 7/2004 Ohtake ................ F02D 41/029
60/295
2008/0167786 A1* 7/2008 Sasaki .................. F02D 35/023
701/102
2008/0243358 A1* 10/2008 Kojima ................ F02D 35/025
701/102
2011/0036332 A1* 2/2011 Iwatani ................ F02B 37/001
123/564
2011/0270511 A1* 11/2011 Kurtz ..................... F02M 26/15
701/105
2012/0042849 A1 2/2012 Sangkyu et al.
2012/0271529 A1* 10/2012 Kashiwagi ............. F02B 37/12
701/102
2013/0186074 A1* 7/2013 Kanba .................. F01N 3/2033
60/286
2013/0261930 A1* 10/2013 Kurtz ..................... F02D 21/08
701/102

FOREIGN PATENT DOCUMENTS

| EP | 1 719 909 A1 | | 11/2006 |
|---|---|---|---|
| EP | 2 123 901 A | | 11/2009 |
| JP | 02075726 A | * | 3/1990 |
| JP | 6-17740 | | 1/1994 |
| JP | H07-30936 Y2 | | 7/1995 |
| JP | 2001-263131 A | | 9/2001 |

* cited by examiner

CONTROL APPARATUS AND CONTROL METHOD FOR DIESEL ENGINE

TECHNICAL FIELD

This invention relates to a control apparatus and control method for a diesel engine.

BACKGROUND ART

Combustion becomes more unstable immediately after a cold start than during a normal operation. That is, the rotations of diesel engines fluctuate more widely. JP2001-263131A discloses a technique for injecting a larger amount of fuel during an idle operation immediately after a cold start than during a normal operation. In this way, the rotational speed of the engine increases, becoming stable earlier.

SUMMARY OF INVENTION

However, there are cases where some of the increased fuel adheres to glow plugs, prohibiting a temperature increase in these glow plugs. Furthermore, the increased rotational speed of the engine also suppresses the temperature increase in the glow plugs, because the inflow of cold outside air (air) increases. If the temperature of the glow plugs does not increase, an unstable combustion state continues. In addition, increasing the fuel leads to a deterioration of the fuel efficiency.

The present invention has been made in consideration of such probabilities. An object of the present invention is to provide a control apparatus and control method for a diesel engine, which are capable of stabilizing combustion at an early stage.

An aspect of a control apparatus for a diesel engine according to the present invention includes a neighboring temperature estimating section which estimates a temperature of a neighborhood of a glow plug that heats an interior of a cylinder upon startup. It further includes a supercharging pressure control section which controls a supercharging pressure in such a way that a rotation fluctuation of the engine does not increase, on the basis of the estimated temperature of the neighborhood of the glow plug.

Some embodiments and advantages of the present invention will be described in detail below in conjunction with the accompanying drawings.

DESCRIPTION OF EMBODIMENTS (First Embodiment)

Figure 1:
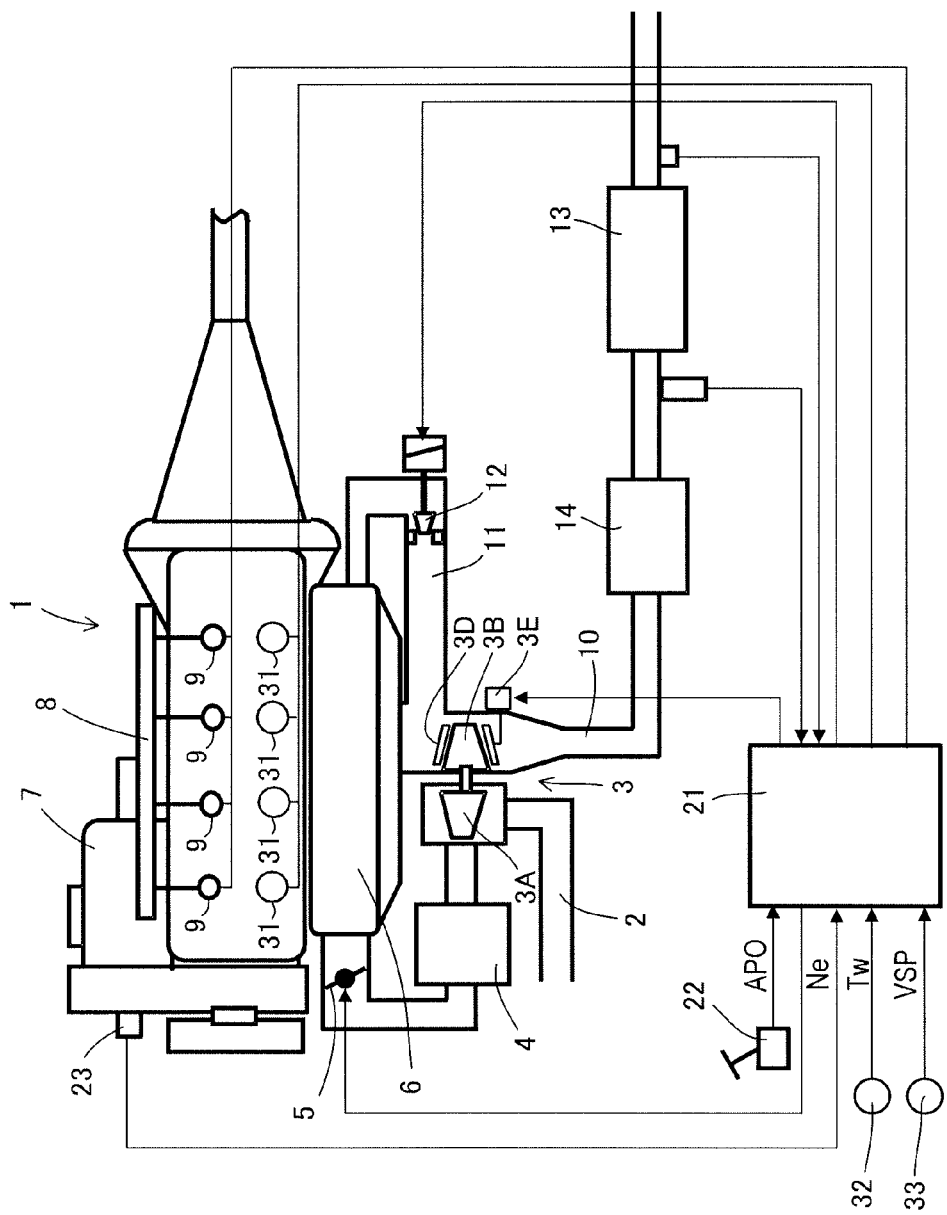
FIG. 1 is a view showing a schematic configuration of a control apparatus for a diesel engine according to a first embodiment of the present invention.

FIG. 1 shows a schematic configuration of a control apparatus for a diesel engine according to a first embodiment of the present invention.

A variable nozzle type of turbo charger 3 includes an inlet compressor 3A, an exhaust turbine 3B, and a shaft 3C that couples them together.

Intake air is supercharged by an inlet compressor 3A provided in an intake passage 2 of a diesel engine 1, and cooled by an intercooler 4. Then, the intake air passes through an intake throttle valve 5, and flows into respective cylinders through a collector 6.

A high-pressure fuel pump 7 increases the pressure of fuel, and delivers it to a common rail 8. Then, fuel injecting valves 9 in the cylinders directly inject the fuel into the cylinders. The high-pressure fuel pump 7, the common rail 8, and the fuel injecting valves 9 configure a common rail type of fuel injecting apparatus. The air flowing into the cylinders and the fuel injected from the fuel injecting valves 9 are compressed and ignited, being burned. Exhaust gas generated by the combustion flows out to an exhaust passage 10.

Some of the exhaust gas flowing out to the exhaust passage 10 is recirculated to the inlet side through an EGR passage 11. This gas is referred to as an EGR gas. The EGR passage is provided with an EGR valve 12. The EGR valve 12 controls the flow volume of the EGR gas in the EGR passage 11.

The remaining exhaust gas passes through the exhaust turbine 3B, driving the exhaust turbine 3B. The exhaust turbine 3B is provided with a variable nozzle 3D at a scroll inlet.

When the variable nozzle 3D is shut, or when the opening of the variable nozzle decreases, the flow velocity of the exhaust gas increases, and then the rotational speed of the exhaust turbine 3B increases. In response, the inlet compressor 3A that is coaxial with the exhaust turbine 3B increases its rotational speed, increasing a supercharging amount.

When the variable nozzle 3D is opened, or when the opening of the variable nozzle increases, the flow velocity of the exhaust gas decreases, and then the rotational speed of the exhaust turbine 3B decreases. In response, the inlet compressor 3A decreases its rotational speed, decreasing the supercharging amount.

In short, the variable nozzle type of turbo charger 3 increases an operating gas by decreasing the opening of the variable nozzle, and decreases the operating gas by increasing the opening of the variable nozzle. Herein, the term "operating gas" refers to air suctioned into cylinders. The variable nozzle 3D is driven by an actuator 3E. The actuator 3E may be either a hydraulically or electrically driven type.

A controller 21 receives signals indicating an accelerator pedal operating amount APO and an engine rotation speed Ne from an accelerator 22 and a crank angle sensor 23, respectively. The controller 21 calculates fuel injecting timing and a fuel injecting amount of main injecting, on the basis of an engine load (accelerator pedal operating amount, etc.) and an engine rotation speed, and outputs valve open instruction signals to the fuel injecting valves 9. Furthermore, the controller 21 performs the EGR control and supercharging control in collaboration with each other, so as to acquire both a target EGR rate and a target intake air amount. It is noted that the controller 21 is configured with a microcomputer provided with a central processing unit (CPU), a read-only memory (ROM), a random-access memory (RAM), and an input and output (I/O) interface.

A diesel particulate filter (hereinafter referred to as a "DPF") 13 that collects particulates in the exhaust is disposed in the exhaust passage 10 located downstream of the exhaust turbine 3B. When the quantity of particulates accumulated in the DPF 13 reaches a preset value (threshold), a post injection is performed during an expansion or exhaust stroke immediately following the main injection. As a result, the particulates accumulated in the DPF 13 are eliminated by being burned, and then the DPF 13 is recycled. That is, the post injecting amount and timing are determined in advance in accordance with operating conditions (load and rotational speed) of the engine, in order to acquire a target recycling temperature. Further, the post injection is performed so that the appropriate post injecting amount and timing are acquired in accordance with the operating conditions of the engine.

In order to completely burn and eliminate particulates accumulated in the DPF 13, or entirely recycle the DPF 13, it is necessary to increase the combustion temperature even just a little within a range not exceeding an acceptable temperature for the DPF 13, during the recycling process. For that purpose, a catalyst 14 is disposed upstream of the DPF 13. The catalyst 14 is, for example, an oxidation catalyst of a precious metal. Alternatively, the catalyst 14 may be any catalyst that has an oxidative function, which may be a three-way catalyst, for example. Unburned fuel that has been post-injected in order to subject the DPF 13 to the recycling process is burned (oxidized) by the catalyst 14. Then, the temperature of the DPF 13 is increased, so that the combustion of particulates in the DPF 13 is facilitated. Instead of providing the catalyst 14 at the front of the DPF 13 as an independent object, a carrier constituting the DPF 13 may be coated with an oxidation catalyst. In this case, an oxidizing reaction occurring during the combustion of particulates is facilitated, and the temperature of the DPF 13 is thereby substantially increased. As a result, the combustion of the particulates in the DPF 13 is facilitated.

It is somewhat difficult to start the diesel engine 1 in a cold state. For this reason, glow plugs 31 used for a cold start are provided opposite the respective cylinders. The glow plugs 31 increase the temperatures of the respective cylinders, enhancing the starting performance of the engine 1.

Figure 4:
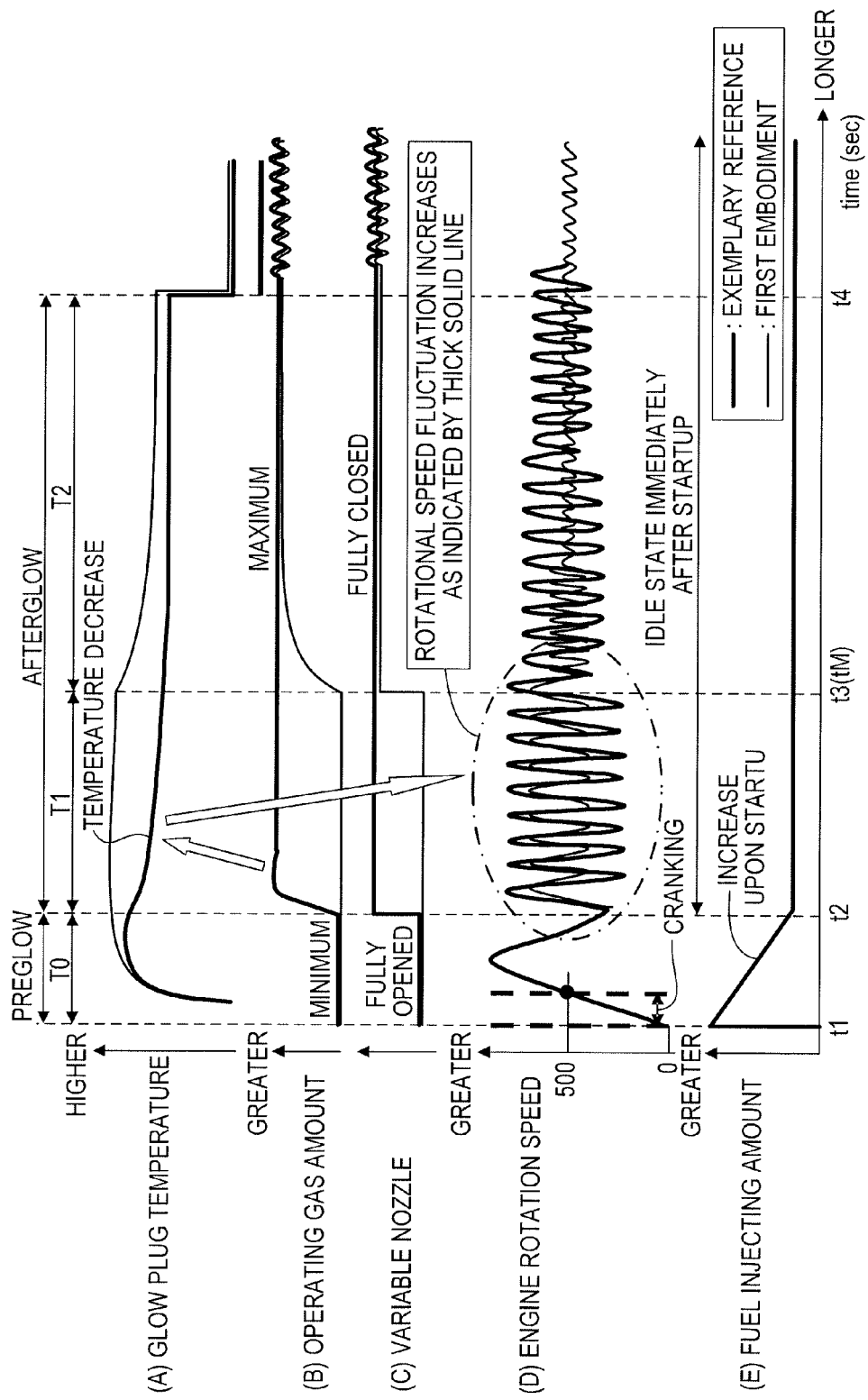
FIG. 4 is a time chart showing changes in a temperature of a glow plug, the amount of an operating gas, an engine rotation speed, and a fuel injection amount, after a cold start of the engine.

An exemplary reference to be compared with this embodiment will be described with reference to FIG. 4. FIG. 4 is a timing chart showing changes in a temperature of a glow plug, the amount of the operating gas, the engine rotation speed, and the injection amount of the fuel, after a cold start of the engine 1. The thick solid line denotes the exemplary reference; the thin solid line denotes the first embodiment that will be described later.

Cranking timing starts at a time t1. At this timing, the fuel injecting amount is corrected to be increased, so that a rich air-fuel mixture in which an air excess rate less than 1.0 is acquired for a cold state. In addition, the energization of the glow plug 31 is started. Then, the engine rotation speed increases rapidly, and the start of the engine 1 is judged at the timing when the engine rotation speed exceeds a preset value (e.g., 500 rpm). The variable nozzle 3D is initially fully opened after the cold start. The corrected and increased amount of the fuel injecting amount becomes 0 after the lapse of a preset time. In other words, the correction of increasing the fuel is terminated. After that, the fuel is injected so that a lean air-fuel mixture in which the air excess rate greater than 1.0 is acquired. The engine 1 begins an idle operation immediately after the cold start, at a time t2. That is, the variable nozzle 3D is switched from a fully open state to a fully close state (the thick solid line in FIG. 4(C)), and the turbo charger 3 starts supercharging. In response, the amount of the operating gas increases (the thick solid line in FIG. 4(B)).

If the amount of the operating gas increases rapidly at the time t2 when the engine 1 begins the idle operation immediately after the cold start, the increased operating gas cools the glow plug 31, decreasing its temperature (the thick solid line in FIG. 4(A)). As a result, the combustion becomes unstable, and the engine rotation speed (idle rotation speed) fluctuates widely (the thick solid line in FIG. 4(D)). In this case, misfire may occur in some of the cylinders due to the unstable combustion.

Some conventional apparatuses compare a fuel injection amount limit in a normal state with that in a cold state, during an idle operation immediately after a cold start, and then set a fuel injection amount limit to a greater one. These apparatuses increase the engine rotation speed in idle operation immediately after the cold start by slightly increasing the fuel injecting amount, thereby stabilizing the engine rotation speed earlier.

However, if the increased fuel adheres to the glow plugs, their temperature increase is suppressed. In addition, when the engine rotation speed increases, the amount of inflow of cold outside air (air) increases, in which case the temperature increase of the glow plugs is also suppressed. Unless the temperature of the glow plugs increases, the combustion maintains an unstable state. In addition, the increase in the fuel leads to a deterioration of the fuel efficiency. Currently, low compression ratio designs for diesel engines are being advanced. With the advance of the low compression ratio designs, the combustion stability is more prone to being worsened during an idle operation immediately after the cold start.

Figure 2:
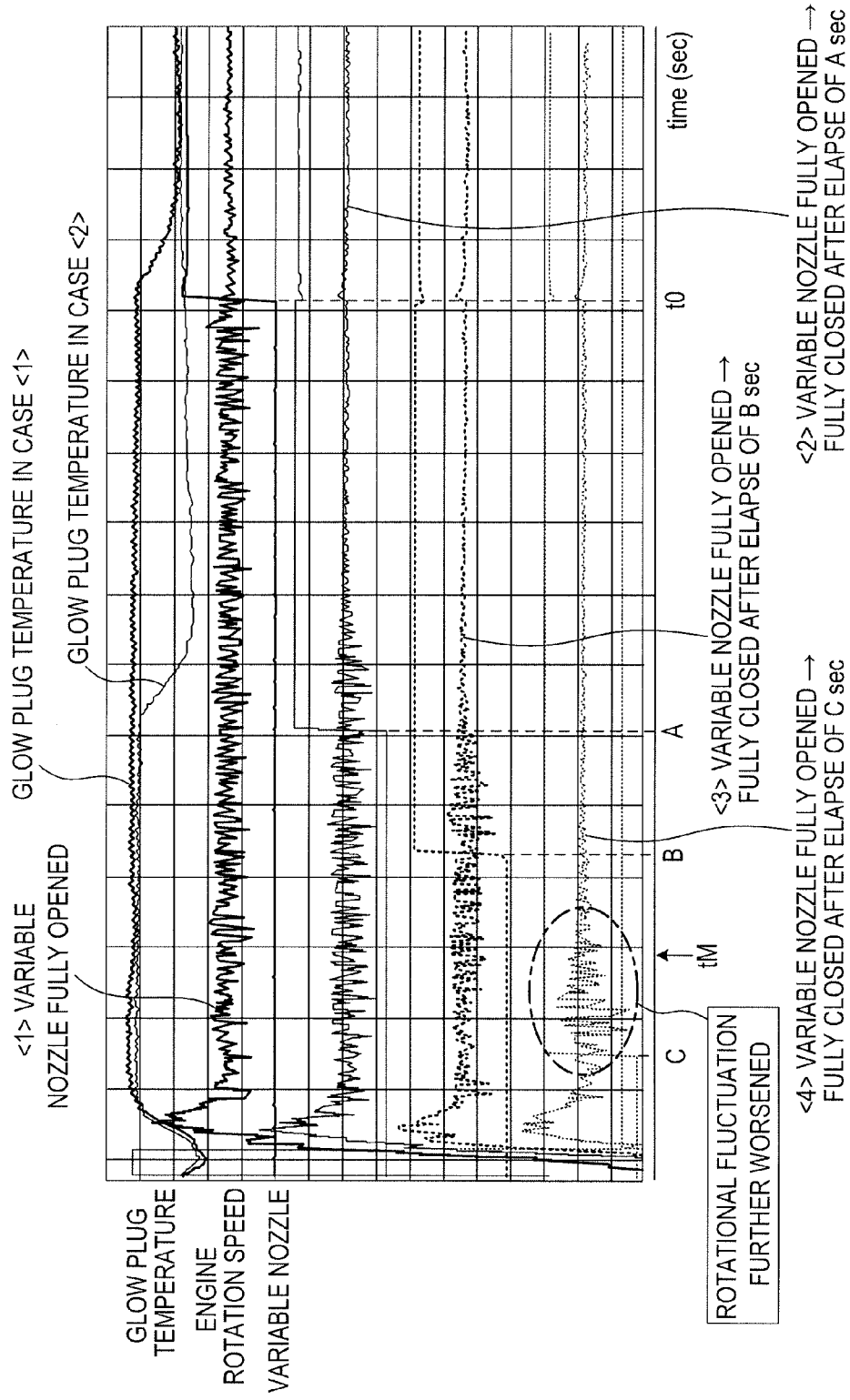
FIG. 2 is a timing chart showing changes in a temperature of a glow plug, an engine rotation speed, and a variable nozzle, in four cases.

In consideration of such worsened idle stability immediately after the cold start, as described above, the present inventors conducted an experiment using a real apparatus, and its result is shown in FIG. 2. The horizontal axis represents a time that has elapsed since the start of cranking (the engine). In the second, third, fourth and fifth stages in FIG. 2, the respective changes in engine rotation speeds and operations of variable nozzles 3D in the four cases <1> to <4> listed below are shown.

<1> the variable nozzle is kept in a fully opened state.
<2> the variable nozzle is switched from a fully opened state to a fully closed state after the elapse of A seconds.
<3> the variable nozzle is switched from a fully opened state to a fully closed state after the elapse of B seconds.
<4> the variable nozzle is switched from a fully opened state to a fully closed state after the elapse of C seconds.

In the above cases <2> to <4>, the relationship $A>B>C>0$ is established. Each of the second to fifth stages in FIG. 2, a line that slightly vibrates vertically indicates an engine rotation speed, and a line that changes step by step denotes the operational state of the variable nozzle. An engine rotation speed with a wider fluctuation range indicates more unstable combustion in cylinders. At the timing when an engine rotation speed changes step by step, a variable nozzle is switched from a fully opened state to a fully closed state.

In the uppermost stage in FIG. 2, the temperature changes in a glow plug 31 for the cases <1> and <2> are shown.

First of all, in order to stabilize the combustion in cylinders, it is preferable for the glow plugs 31 not to be cooled. The inventors accordingly kept the variable nozzle 3D in a fully opened state (in this state, the amount of the operating gas is kept at a minimum) even after an idle operation following a cold start, and monitored its state. This corresponds to the case <1>.

The uppermost stage in FIG. 2 reveals that the temperature of the glow plug 31 does not decrease even during the idle operation immediately after the cold start, as long as the amount of the operating gas is kept at a minimum, as expected by the inventors. Suppressing the temperature decrease in the glow plug 31 stabilizes the combustion, reducing a possibility of an occurrence of misfire.

In the case <1>, the engine 1 temporarily continues the idle operation immediately after the cold start, and then the variable nozzle 3D is switched from a fully opened state to a fully closed state at a time t0. After this switching, the fluctuation amount of the engine rotation speed is reduced (the idle rotation speed becomes stable). The inventors found out this fact for the first time.

Next, the timing at which the variable nozzle 3D is switched from a fully opened state to a fully closed state is quickened stepwise, in comparison with the case <1>. That is, in the case <2>, the switching is taken place after the elapse of A seconds. In the case <3>, the switching is taken place after the elapse of B seconds. In the case <4>, the switching is taken place after the elapse of C seconds. In the cases <2> and <3>, the idle rotation speed becomes stable immediately after the switching, but in the case <4>, the switching timing is so early that the idle rotation speed (or the combustion state) becomes more unstable. This implies the presence of optimum switching timing between B and C seconds, at which a rotational fluctuation is reduced at an early stage while preventing an unstable rotation during an idle operation immediately after a cold start. Assuming that this optimum switching timing is denoted by "tM" seconds, a transition to a stable idle operation could be taken place at an early stage by switching the variable nozzle from a fully opened state to a fully closed state after the elapse of tM seconds.

Figure 3:
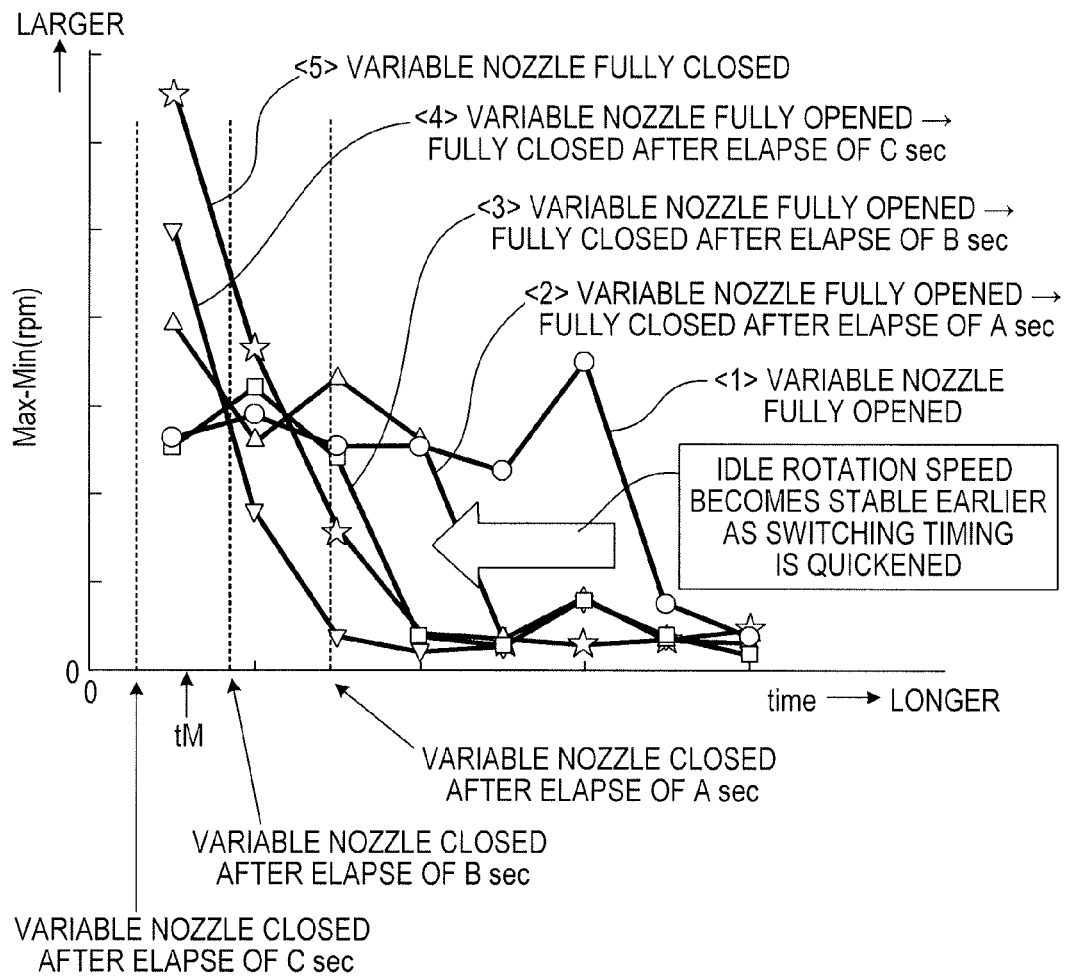
FIG. 3 is a characteristic view of a fluctuation amount of a rotational speed over a time that has elapsed since a startup.

In FIG. 3, the fluctuation ranges (represented by "Max-Min" in this drawing) of the engine rotation speeds acquired from the experimental result in FIG. 2 at eight regular sampling intervals are plotted. For comparison, a case (case <5>) in which the variable nozzle has been continuously fully closed since the cold start is also shown. FIG. 3 reveals that as a value on the vertical axis decreases, an engine rotation speed is more stable. It can also be seen from FIG. 3 that when timing at which the variable nozzle is switched from a fully opened state to a fully closed state is quickened from A seconds to B seconds, the idle rotation speed becomes stable earlier. However, it can be seen that the idle rotation speed becomes more unstable, when the switching timing is further quickened from B seconds to C seconds.

In the first embodiment, therefore, the intake air amount is set relatively small upon cold start, and then relatively large when a predetermined condition is reached during an idle operation immediately after a cold start. This enables an early transition to a stable idle operation immediately after a cold start to be made without causing excessive idle instability.

Details of the above will be described with reference to FIG. 4. In FIG. 4, the thin solid lines indicate the first embodiment. The engine 1 in this embodiment keeps the variable nozzle in a fully opened state, even after a time t2 at which the engine 1 transits to an idle operation immediately after a cold start, and keeps the amount of the operating gas at a minimum during the idle operation (thin solid lines in FIGS. 4(B) and (C)). In this case, the temperature of the glow plug 31 is not decreased but kept constant, during the idle operation immediately after the cold start, as opposed to the exemplary reference (the thin solid line in FIG. 4(A)). Preventing the temperature decrease in the glow plugs in this manner increases the temperature of the compression end, facilitating the ignition of the fuel in the operating gas. This reduces a possibility of an occurrence of misfire, stabilizing the combustion. Consequently, this embodiment reduces a fluctuation amount of an idle rotation speed immediately after a cold start, in comparison with the exemplary reference (the thin solid line in FIG. 4(D)).

A time t3 (=tM) is optimum switching timing at which a rotational fluctuation is reduced while preventing an unstable rotational during an idle operation immediately after a cold start. The time t3 has been introduced by this embodiment, for the first time. This timing is determined in advance on the basis of adaptation. In this embodiment, when the time t3 comes, the predetermined condition is determined to be reached, and the variable nozzle 3D is switched from a fully opened state to a fully closed state. In response, the amount of the operating gas is maximized during the idle operation immediately after the cold start, and the fluctuation amount of the rotational speed becomes smaller after the time t3 than before the time t3 (the thin solid line in FIG. 4(D)).

Determination whether the time t3 has come or not (or whether the predetermined condition has been reached or not) may be made in the following manner. In FIG. 4, a time period between the time t1 when the cold start is performed and the time t2 when the idle operation immediately after the cold start is initiated is defined as a time "T0." A time period between the time t2 and the time t3 is defined as a time "T1." A first timer is activated at the time t1, and when the value in the first timer reaches T0+T1, the time t3 can be determined to have come (the predetermined condition can be determined to have been reached). An alternative method can be to activate a second timer at the time t2 and when the value of the second timer reaches T1, the time t3 can be determined to have come (the predetermined condition can be determined to have been reached). The flowcharts in FIGS. 5 and 7, which will be described later, correspond to the latter method. It is noted that control over the glow plugs 31 during a period between a cold start and a transition to an idle operation immediately after the cold start is referred to as preglow. Control over the glow plug 31 during a period between the transition to the idle operation immediately after the cold start and a time t4 when the energization of the glow plug 31 is terminated is referred to as afterglow.

In this embodiment, the turbo charger 3 with the variable nozzle 3D adjusts the amount of the operating gas during the idle operation immediately after the cold start, but the present invention is not limited to this adjustment scheme. Alternatively, the adjustment may be made by the intake throttle valve 5. For example, the variable nozzle 4D is kept in a fully opened state over a period between the cold start and timing (time t4) when the afterglow is terminated. The intake throttle valve 5 is closed upon cold start so that the amount of the operating gas decreases, and fully opened at the time t3 in FIG. 4 so that the amount of the operating gas increases. Using the intake throttle valve 5 in this manner enables the amount of the operating gas to be also adjusted.

Figure 5:
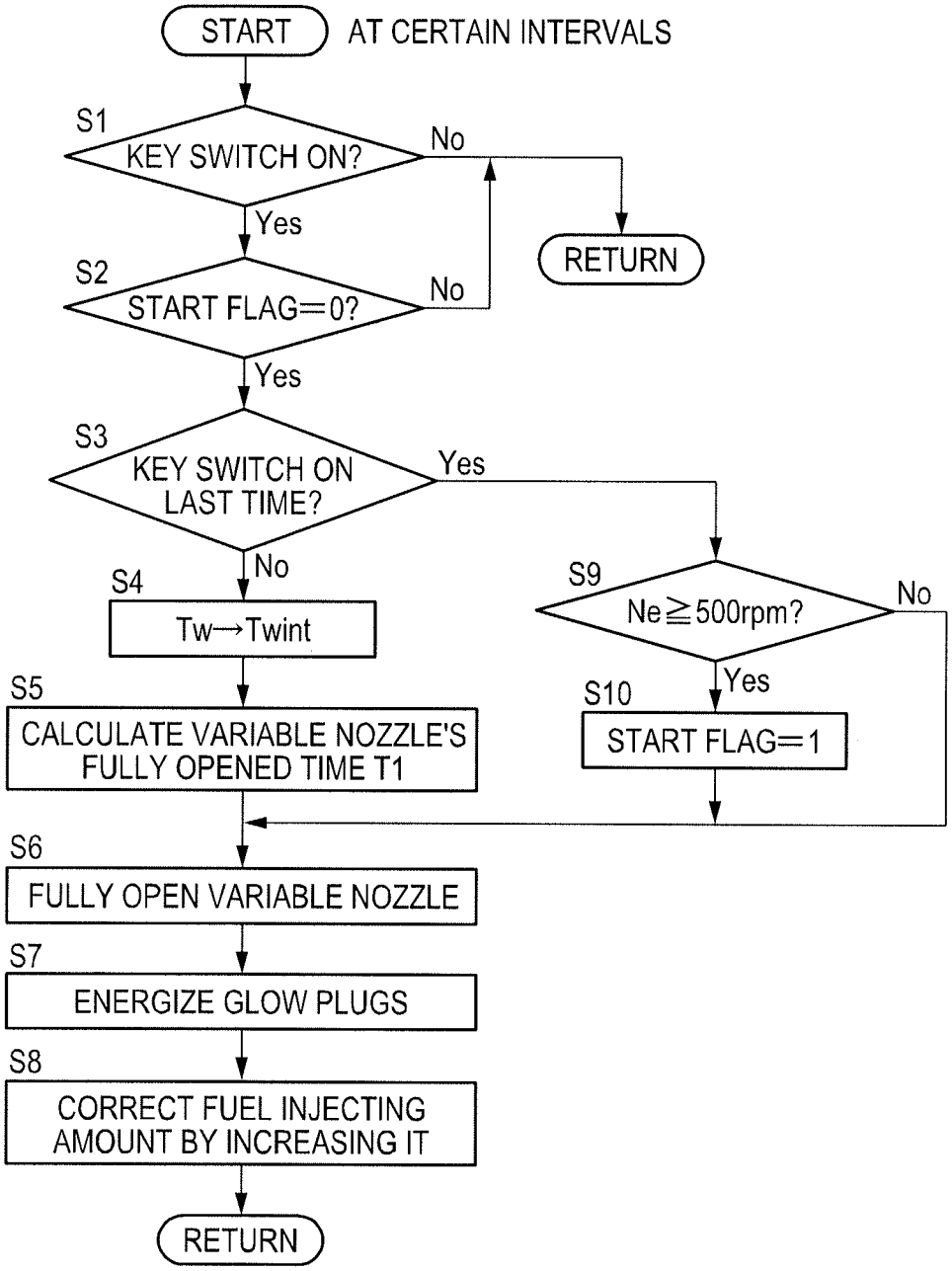
FIG. 5 is an explanatory flowchart of setting a start flag in the first embodiment.

Next, a detailed description will be given of a control procedure in which the controller 21 makes a transition from a cold start to an idle operation immediately after the cold start and terminates afterglow, with reference to the flowcharts in FIGS. 5 and 7. FIG. 5 is a flowchart showing a method of setting a start flag. This flowchart is performed at certain intervals (e.g., 10 ms).

At Step S1, in performing a cold start of the engine, the controller determines whether a key switch is ON or not, this time. If the determination result is "Yes," the controller moves the processing to Step S2. If the determination result is "No," the controller causes the processing to exit from this flowchart.

At Step S2, the controller determines whether or not a start flag (was set to 0 after the engine had been operated and stopped last time) is 0. If the determination result is "Yes," the controller moves the processing to Step S3. If the determination result is "No," the controller causes the processing to exit from this flowchart. In this case, suppose the start flag is 0, and the controller accordingly moves the processing to Step S3.

At Step S3, the controller determines whether or not the key switch was ON last time. If the determination result is "No," the controller moves the processing to Step S4. If the determination result is "Yes," the controller moves the processing to Step S9. When the key switch was OFF last time and is ON this time, namely, when the key switch is switched from OFF to ON, the controller determines that there has been a request to start the engine, and moves the processing to Step S4.

At Step S4, the controller sets a water temperature Tw [° C.] detected by a water temperature sensor 32 to a starting water temperature Twint [° C.].

Figure 6:
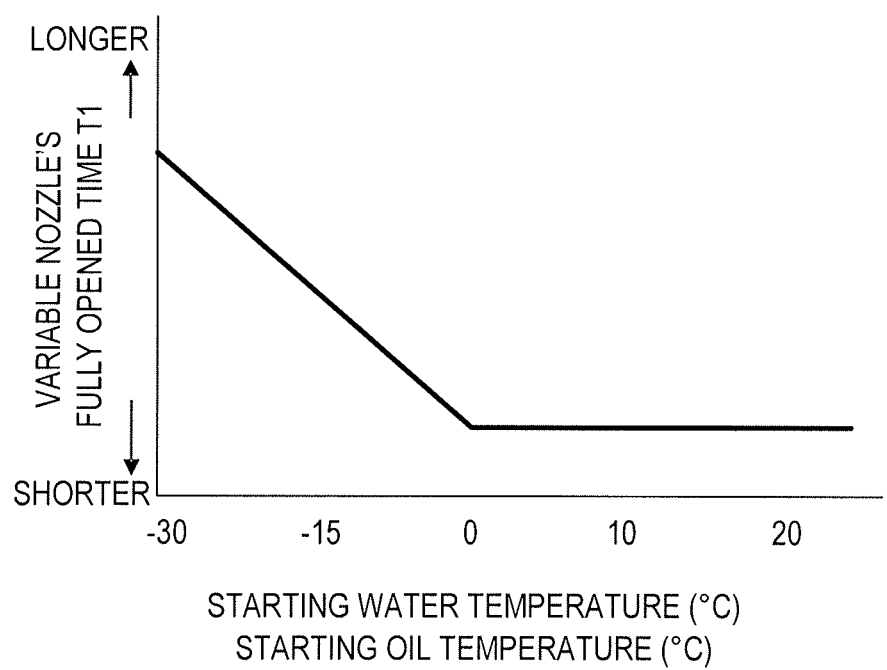
FIG. 6 is a characteristic view of a variable nozzle's fully opened time.

At Step S5, the controller searches a table in FIG. 6, and then determines a time T1 [sec] (hereinafter referred to as a "variable nozzle's fully opened time") at which the variable nozzle 3D is fully opened during an idle operation immediately after a cold start. The time T1 is a time period between the time t2 and the time t3 (=tM) in FIG. 4. Herein, the term "cold" refers to a below zero temperature range. As shown in FIG. 6, when the starting water temperature Twint falls within a below zero temperature range (a range of a temperature below 0° C.), as it decreases, the variable nozzle's fully opened time T1 is extended. When the starting water temperature Twint falls within a range of a temperature above 0° C., the variable nozzle's fully opened time T1 becomes constant. The reason why the variable nozzle's fully opened time T1 is extended as the starting water temperature Twint that falls within a below zero temperature range decreases is a measure for the extension of a time required for a rotational fluctuation to become stable during an idle operation immediately after a cold start. The lower the starting water temperature Twint becomes, the longer this required time becomes. Instead of the starting water temperature Twint, a starting oil temperature can be used. Alternatively, a fixed value may be employed as the variable nozzle's fully opened time T1, for the sake of simplification.

At Step S6, the controller fully opens the variable nozzle 3D so as to minimize the amount of the operating gas.

At Step S7, the controller energizes the glow plugs 31.

At Step S8, the controller corrects the fuel injecting amount by increasing it, so as to acquire a rich air-fuel mixture in which an air excess rate less than 1.0. This corrected and increased amount gradually decreases over time, and finally becomes 0.

When the key switch was ON last time and is also ON this time, namely, when the key switch has been continuously ON, the processing proceeds in order of S1, S2, S3 and S9.

At Step S9, the controller determines whether or not the engine rotation speed Ne [rpm] detected by a crank angle sensor 23 exceeds a preset value (e.g., 500 rpm). If the determination result is "Yes," the controller moves the processing to Step S10. If the determination result is "No," the controller moves the processing to Step S6. In this case, the engine 1 has not yet started.

If the determination result at Step S9 is "Yes," the engine 1 has already started (performed a cold start). At Step S10, the controller accordingly sets the start flag to 1. Setting the start flag to 1 prevents the processing from proceeding from Step S2 to Step S3 next time.

Figure 7:
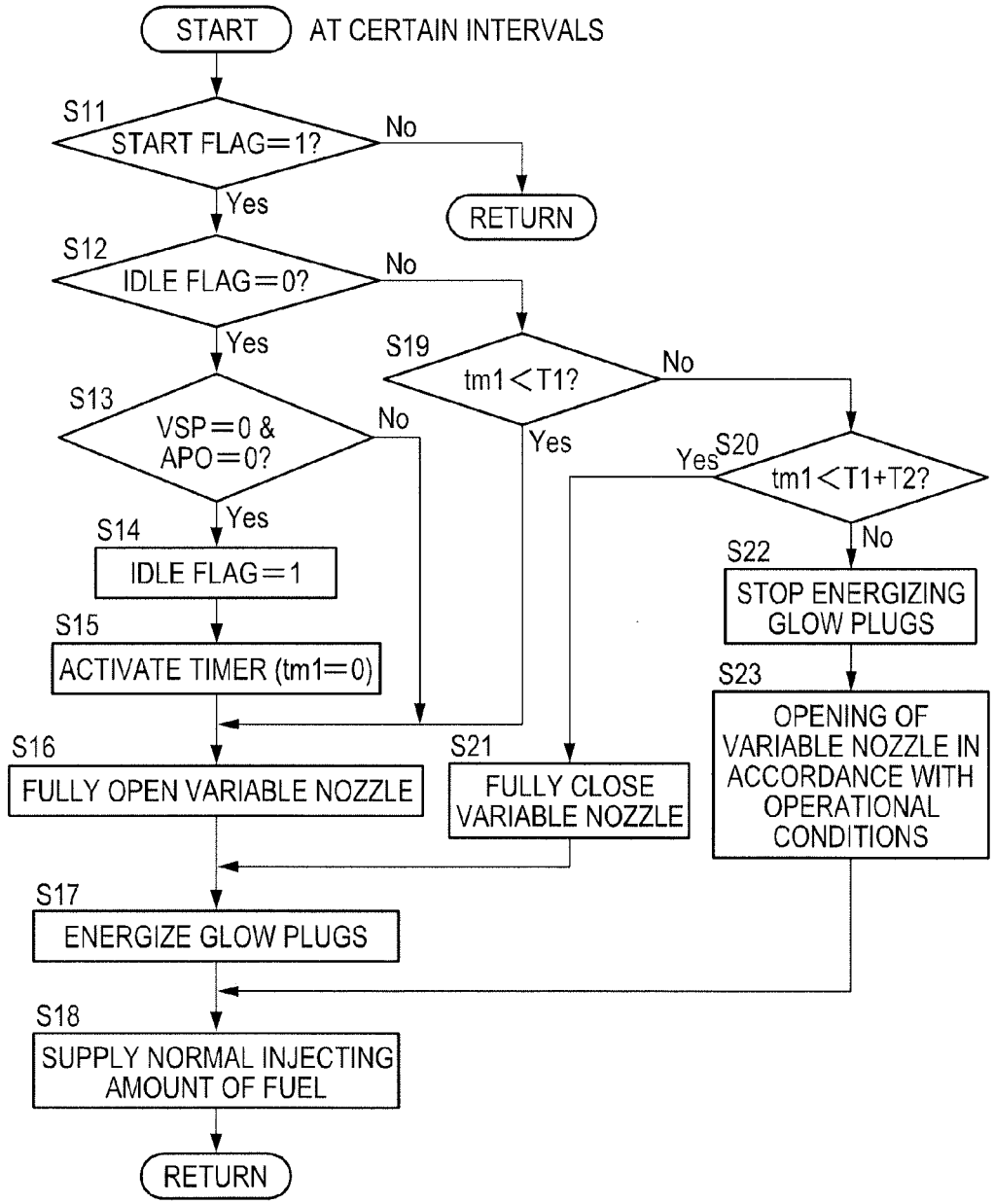
FIG. 7 is an explanatory flowchart of control performed between a transition to an idle operation immediately after a cold start and the termination of afterglow, in the first embodiment.

FIG. 7 is a flowchart of controlling the variable nozzle 3D, the glow plugs 31, and the fuel injecting amount, immediately after a cold start. The flowchart in FIG. 7 is performed following the flowchart in FIG. 5 and at certain intervals (e.g., 10 ms).

At Step S11, the controller determines whether the start flag is 1 or not. This start flag has been set in the flowchart in FIG. 5. If the determination result is "Yes," the controller moves the processing to Step S12. If the determination result is "No," the controller causes the processing to exit from this flowchart.

At Step S12, the controller determines whether or not an idle flag (that has been initially set to 0 when the engine starts) is 0. If the determination result is "Yes," the controller moves the processing to Step S13. If the determination result is "No," the controller moves the processing to Step S19. In this case, suppose the idle flag is 0, and the processing accordingly proceeds to Step S13.

At Step S13, the controller determines whether or not a vehicle speed VSP [km/h] detected by a vehicle speed sensor 33 is 0 and the accelerator pedal operating amount APO [unitless number] detected by the accelerator 22 is 0. If the determination result is "Yes," the controller moves the processing to Step S14. If the determination result is "No," the controller moves the processing to Step S16.

If the determination result at Step S13 is "Yes," the engine 1 has transited to an idle operation immediately after a cold start, the vehicle speed VSP being 0, the accelerator pedal operating amount APO being 0. Therefore, the controller sets the idle flag to 1 at Step S14.

At Step S15, the controller sets a timer value tm1 [sec] to 0, and activates a timer. The timer measures a time that has elapsed since the transition to the idle operation immediately after the cold start.

If the determination result at Step S13 is "No," the vehicle speed VSP or the accelerator pedal operating amount APO is not 0. In other words, the engine 1 has not yet transited to an idle operation immediately after the cold start. In this case, the controller skips Step S14 and Step S15, and moves the processing to Step S16.

At Step S16, the controller fully opens the variable nozzle 3D, thereby keeping the amount of the operating gas at a minimum.

At Step S17, the controller energizes (keeps energizing) the glow plugs 31.

At Step S18, the controller supplies a normal injecting amount of fuel. The expression "a normal injecting amount of fuel" refers to an injecting amount of fuel which is supplied to the fuel injecting valve 9 after the corrected and increased amount of the fuel becomes 0. The air excess rate of the air-fuel mixture which is acquired by the normal injecting amount of fuel is above 1.0, or a value on the lean side.

If the idle flag is 1 at Step 14, the controller will move the processing from Step S12 to Step S19 next time.

At Step S19, the controller determines whether or not the timer value tm1 is less than the variable nozzle's fully opened time T1 (that has been calculated at Step 5 in FIG. 5). If the determination result is "Yes," the controller moves the processing to Step S16. If the determination result is "No," the controller moves the processing to Step S20.

When the determination result is "No" at Step S19, the optimum switching timing (tM) is determined to have been reached. In this case, at Step S20, the controller determines whether or not the timer value tm1 is less than a value obtained by adding a certain time T2 to the variable nozzle's fully opened time T1. If the determination result is "Yes," the controller moves the processing to Step S21. If the determination result is "No," the controller moves the processing to Step S22. The time T2 is a time period between the optimum switching timing t3 (=tM) and the time t4 when the afterglow is terminated, as in FIG. 4. The time T2 is also defined in advance with adaptation. When the timer value tm1 is less than the time (T1+T2), the optimum switching timing (tM) has been reached. At Step S21, the controller therefore fully closes the variable nozzle 3D, so that the amount of the operating gas is maximized during the idle operation immediately after the cold start. As a result, the rotational fluctuation is reduced during the idle operation immediately after the cold start, and then the idle rotation becomes stable. After that, Step S17 and Step S18 are performed.

At Step S22, the controller stops energizing the glow plugs 31, and terminates the afterglow.

At Step S23, the controller adjusts the opening of the variable nozzle in accordance with operating conditions.

Next, functions and effects of this embodiment will be described.

According to this embodiment, as soon as the engine 1 transits to an idle operation immediately after a cold start, the glow plugs 31 are not easily cooled by an operating gas (intake air), because the amount of the operating gas is small (time t2 to t3 in FIG. 4(B)). Therefore, a fuel injected from the fuel injecting valves 9 is easily ignited by the glow plugs 31, and a possibility of an occurrence of misfire is thereby reduced.

Next, after the engine 1 has transited to the idle operation immediately after the cold start, a thermal atmosphere in each cylinder, such as a wall temperature, is improved due to the assist of the glow plugs 31, and a temperature of the compression end is increased. Then, when the atmosphere in which the temperature of the compression end is increased and a contribution of the glow plugs 31 to the combustion is reduced is prepared, the amount of the operating gas is increased (time t3 to t4 in FIG. 4(B)). When the increased operating gas burns, the combustion temperature increases, and the combustion stability is improved earlier. This enables an early transition to a stable idle operation immediately after a cold start to be made without causing excessive idle instability.

According to this embodiment, as the start temperature of the cooling water Twint (engine temperature upon cold start) decreases, the variable nozzle's fully opened time T1 is extended (FIG. 6). Therefore, even when the start temperature of the cooling water Twint varies upon cold start, it is possible to achieve a stable idle operation at an early stage without causing excessive idle instability immediately after the cold start.

According to this embodiment, the amount of intake air is adjusted by the variable nozzle 3D in the turbo charger 3. That is, as soon as a cold start is performed, the variable nozzle 3D is fully opened. And the variable nozzle 3D is fully closed at the switching timing tM. Since the amount of intake air is adjusted by the variable nozzle 3D in the above-mentioned way, the diesel engine 1 with the variable nozzle type of turbo charger 3 may be applicable without involving any additional device, which suppresses a cost increase.

This embodiment has been described regarding the case where the opening of a variable nozzle is initially fully opened after a cold start and then fully closed. However, the present invention is not limited to this scheme. It is only necessary to initially set the opening of the variable nozzle relatively small after a cold start, and then relatively large.

(Second Embodiment)

Figure 8:
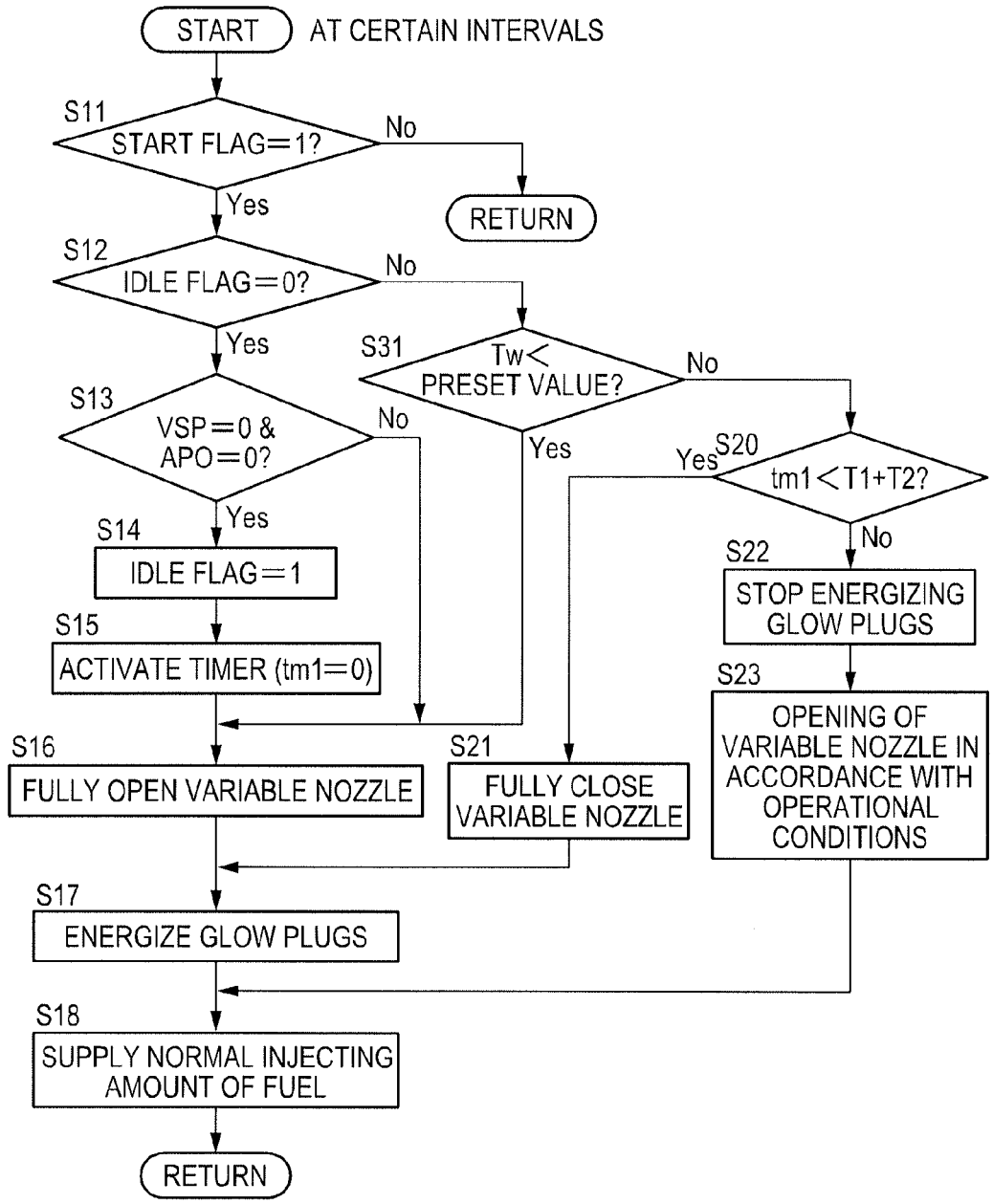
FIG. 8 is an explanatory flowchart of control performed between a transition to an idle operation immediately after a cold start and the termination of afterglow, in a second embodiment.

FIG. 8 is a flowchart of a second embodiment. The same step numbers are assigned to the same parts as those in the first embodiment as in FIG. 7

The second embodiment differs from the first embodiment in Step S31.

At Step S31, the controller determines whether or not the temperature of the cooling water Tw is lower than a preset value [° C.] during the idle operation immediately after the cold start. This preset value is the lower temperature limit of the cooling water, which can reduce the rotational fluctuation at an early stage while preventing an unstable rotation during the idle operation immediately after the cold start. The preset value is defined in advance with adaptation. If the determination result is "Yes," the controller moves the processing to Step S16. If the determination result is "No," the controller moves the processing to Step S20.

This second embodiment also enables an early transition to a stable idle operation immediately after a cold start to be made without causing excessive idle instability, similar to the first embodiment.

(Third Embodiment)

As described above, studies have been conducted on diesel engines with lower compression ratios than conventional ones. When a compression ratio decreases, a temperature of a compression end also decreases. Accordingly, an ignition performance upon an engine start and idle combustion stability are worsened, in particular, at low temperatures. Therefore, using an idle-up function facilitates an early transition to a stable idle operation. This idle-up function can also operate a supercharger. Operating the supercharger decreases the penetrating power of fuel, as described later, thus reducing a risk that the fuel will adhere to the glow plugs.

In the first and second embodiments, when the condition is satisfied, the variable nozzle or the like is changed step by step in order to increase the amount of the operating gas. This achieves an early transition to a stable idle operation immediately after a cold start without causing excessive idle instability.

As a result of additional earnest studies, the inventors, et al. could clarify a mechanism in which the stability increases when the variable nozzle is switched from a fully opened state to a fully closed state in the case <2> or <3> or the timing tM but the stability is further worsened in the case <4> in FIG. 2. Then, the inventors, et al. have developed a method of making an earlier transition to a stable idle operation, on the basis of those findings. The findings that the inventors have made will be described, for the purpose of facilitating an understating of this embodiment.

The inventors focused attention on a relationship between an ignition performance and both an equivalent ratio and temperature of a neighborhood of a glow plug. In order to increase a temperature of a combustion end, it is necessary to increase the pressures inside cylinders by supercharging them. In response to the pressure increase in the cylinders, the penetrating power of the fuel decreases, and the equivalent ratio of the neighborhood of each glow plug increases. This will be described with reference to FIG. 9.

Figure 9:
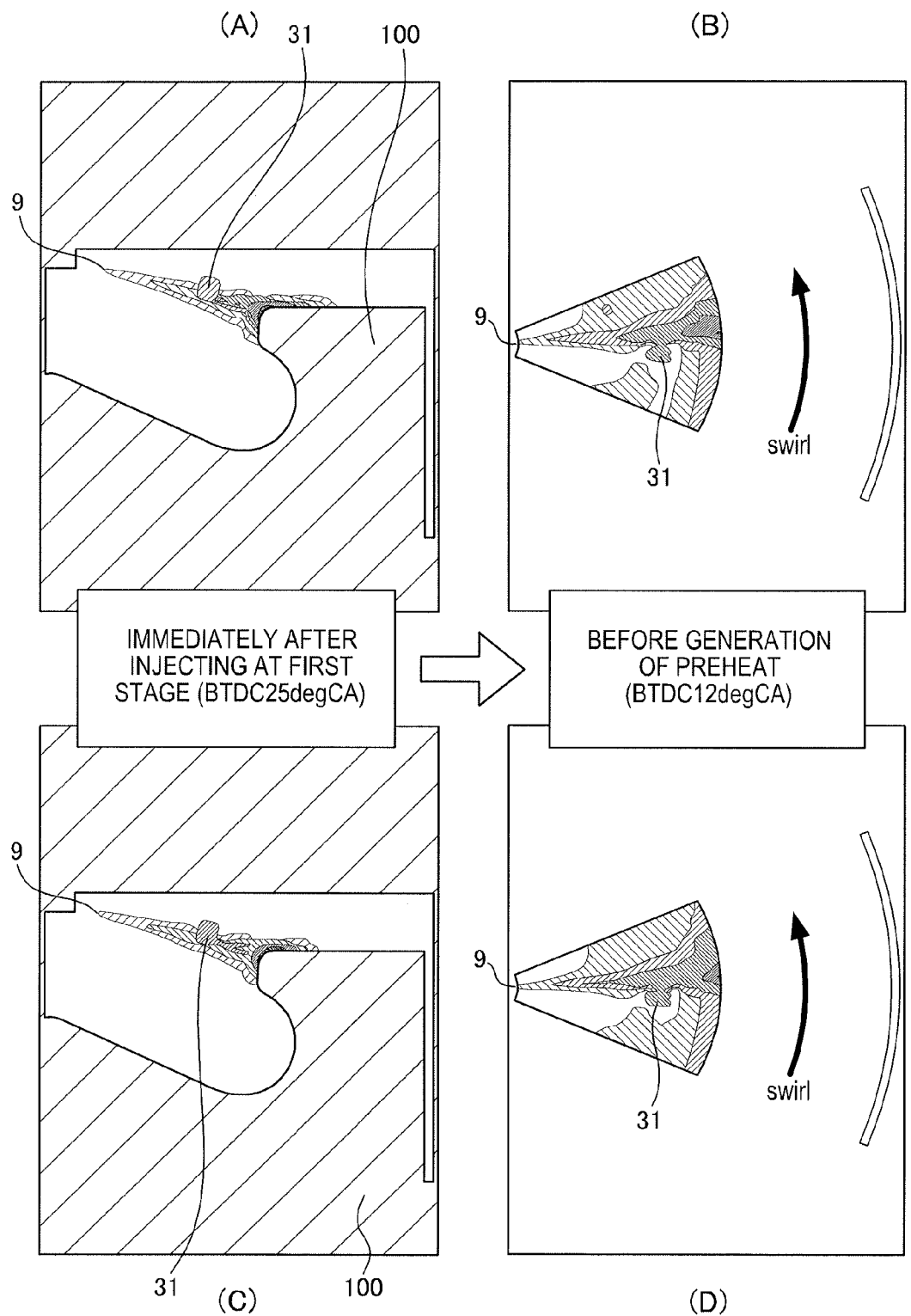
FIG. 9 is a view showing simulation results for a fuel distribution in a cylinder with and without supercharging.

FIG. 9 shows simulation results for a fuel distribution inside a cylinder with and without supercharging. The denser a region, the greater the fuel distribution. FIGS. 9(A) and 9(C) show vertical cross sections of the right-half part of the cylinder, and the left end of each of FIGS. 9(A) and 9(C) is the center of the engine. In FIG. 9(A), the supercharging is not performed; in FIG. 9(C), the supercharging is performed. Other conditions, such as the fuel injecting amount and timing, are the same. FIGS. 9(B) and 9(D) each show the cross section of the cylinder as viewed from the top, and indicate the fuel distribution on the crest surface of the piston which extends to the cavity edge. FIG. 9(B) does not involve supercharging, and corresponds to FIG. 9(A); FIG. 9(D) involves supercharging, and corresponds to FIG. 9(C). Each arrow indicates the direction of the swirl. In each of FIGS. 9(B) and 9(D), the distribution of the fuel injected from one of eight nozzles in the fuel injecting valve is shown.

A cavity is formed in the crest surface of a piston 100. A fuel injected from a fuel injecting valve 9 passes through the neighborhood of the glow plug 61, and reaches the cavity edge.

When supercharging is not performed, as can be seen from FIG. 9(A), the penetrating power of the fuel increases, and a large amount of fuel reaches the outer side of the cavity edge. Therefore, a small amount of fuel is present in the neighborhood of the glow plug. As can be seen from FIG. 9(B), the fuel distribution in the cavity decreases.

When supercharging is performed, as can be seen from FIG. 9(C), the penetrating power of the fuel decreases, and a smaller amount of fuel reaches the outer side of the cavity edge than the case in FIG. 9(A). Therefore, a larger amount of fuel is present in the neighborhood of the glow plug than the case in FIG. 9(A). As can be seen from FIG. 9(D), the fuel distribution in the cavity is denser than that in FIG. 9(B).

As is clear from the above description, performing supercharging increases the equivalent ratio of the neighborhood of each glow plug. Therefore, by supercharging the cylinders while changing the variable nozzle step by step as in the first or second embodiment, the equivalent ratio of the neighborhood of each glow plug is increased, so that the performance of a cold start can be improved. Performing supercharging, however, also increases an inflow of cold air. This increased cold air cools the glow plugs. The inventors disclosed this fact through researches.

Figure 10:
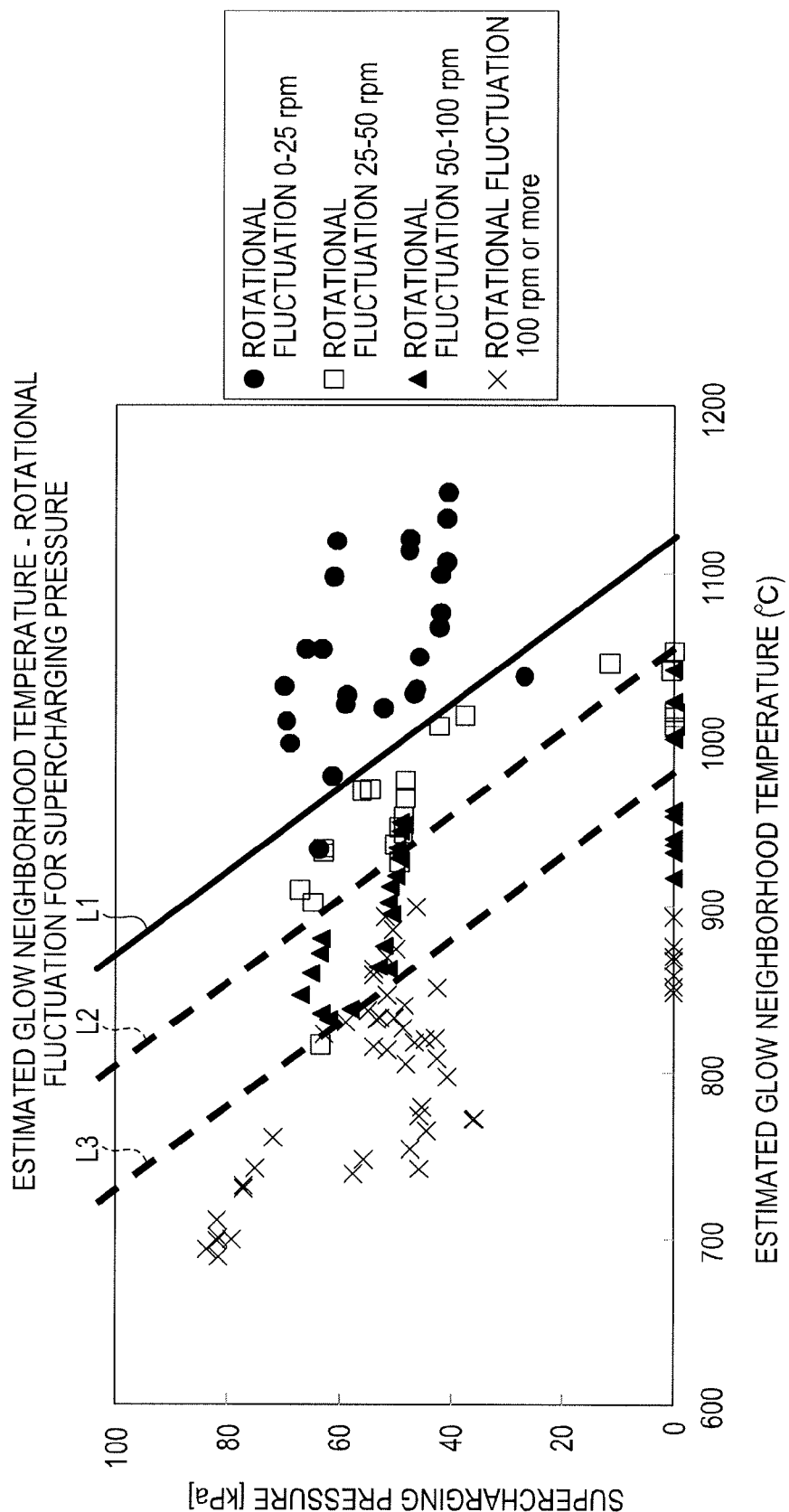
FIG. 10 is a view showing an experimental result of measuring a rotational fluctuation of the engine in an environment of −25° C. for a temperature of a neighborhood of a glow plug and a supercharging pressure.

FIG. 10 shows an experimental result of measuring a rotational fluctuation of an engine in an environment of −25° C. for a temperature of a neighborhood of a glow plug and a supercharging pressure. The horizontal axis represents an estimated temperature of a neighborhood of a glow plug; the vertical axis represents a supercharging pressure. An estimated temperature of the neighborhood of the glow plug TGA is determined from a sum of a surface temperature of a glow plug TG, a value obtained by multiplying a temperature of cooling water TW by a coefficient K1, and a value obtained by multiplying a temperature of intake air TI by a coefficient K2. That is, a relationship expressed by the following equation is established. In this equation, the coefficients K1 and K2 may be defined as appropriate.

[Equation 1]

$$TGA = TG + TW \times K1 + TI \times K2 \quad (1)$$

The surface temperature of the glow plug TG is detected by a temperature sensor attached to this glow plug. Furthermore, the surface temperature of the glow plug is duty-controlled in such a way that it becomes a preset target temperature. Therefore, the preset target surface temperature for the glow plug may be used. The temperature of the cooling water TW is detected by a temperature sensor attached to a passage for cooling water. The temperature of the intake air TI is detected by a temperature sensor attached to the collector 6. Each coefficient may be defined with adaptation. The black circles indicate a small rotational fluctuation, and then the rotational fluctuation increases, or the combustion stability is worsened, in the order of the white rectangles, the black triangles and the crosses.

As can be seen from the distribution of each point, the points are somewhat concentrated in a specified region rather than being separated from one another.

That is, the black circles are concentrated in the upper right area. The region in which the black circles are concentrated is separated by the downward-sloping line L1. The region on the right side of the line L1 is a stable region with the small rotational fluctuation.

Likewise, the white rectangles, the black triangles and the crosses are somewhat concentrated in specified regions, and these regions are separated from one another by the lines L2 and L3.

Each of the regions partitioned by the lines is an equal rotational fluctuation region with a nearly equal rotational fluctuation. Each equal rotational fluctuation region indicates nearly equal degrees of combustions.

As described with reference to FIG. 9, when supercharging is performed, the equivalent ratio in the neighborhood of each glow plug increases, and the combustion stability therefore seems to be improved. However, performing the supercharging increases an inflow of cold air, and this air cools the glow plugs. Thus, the experimental result in FIG. 10 reveals that only increasing the supercharging pressure does not lead to the stable combustion.

Figure 11A:
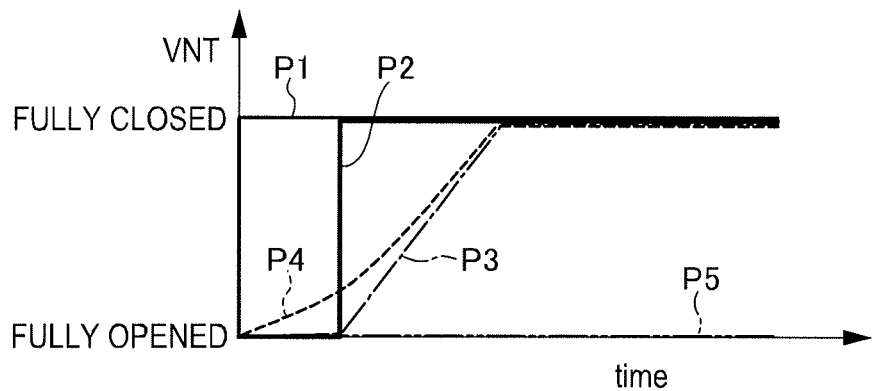
FIG. 11A is a view showing control patterns for the opening of the variable nozzle.
Figure 11B:
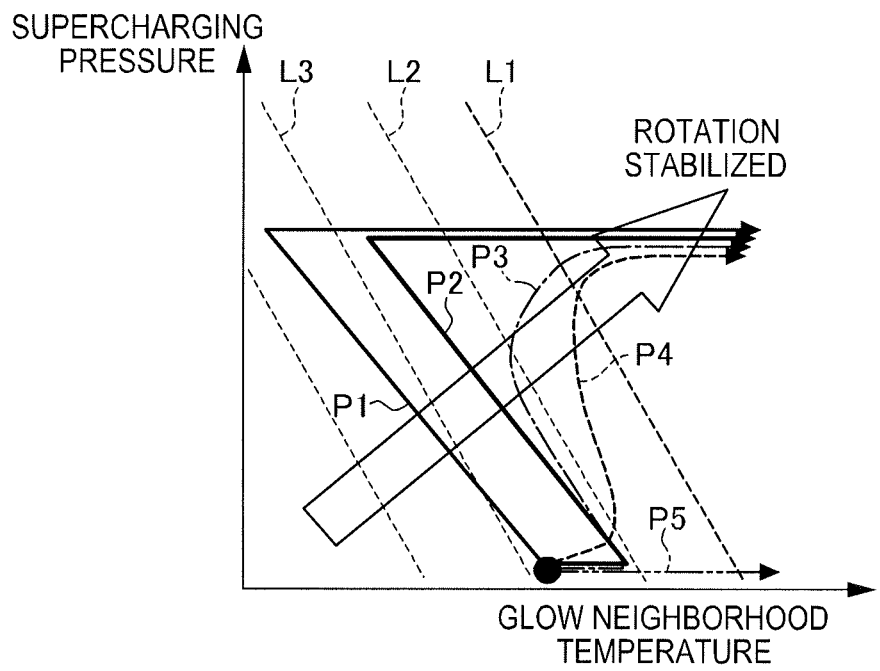
FIG. 11B is a view showing changes in a temperature of a neighborhood of a glow plug and a supercharging pressure, when the opening of the variable nozzle is controlled.

FIG. 11A shows control patterns for the opening of a variable nozzle. FIG. 11B shows changes in a temperature of a neighborhood of a glow plug and a supercharging pressure, when the opening of a variable nozzle is controlled.

Next, a description will be given of changes in a temperature of a neighborhood of a glow plug and a supercharging pressure, when the opening of a variable nozzle is controlled, with reference to FIGS. 11A and 11B.

The pattern P1 in FIG. 11A is a pattern in which the variable nozzle is switched early from a fully opened state to a fully closed state. This corresponds to the case <4> in FIG. 2. When the opening of the variable nozzle is controlled like the pattern P1, the temperature of the neighborhood of the glow plug is decreased greatly with the increase in the supercharging pressure, as shown in FIG. 11B. That is, a temperature of a neighborhood of a glow plug is influenced by both a surface temperature of the glow plug and a temperature of cooling water. According to the pattern P1 in which the supercharging pressure increases when the cooling water has a low temperature, the temperature of the neighborhood of the glow plug greatly decreases with the increase in the supercharging pressure. Therefore, the engine rotation temporarily falls within a larger fluctuation region (the region on the left side of the line L3) than at present, and then is becoming stable.

The pattern P2 in FIG. 11A is a pattern in which the variable nozzle is switched step by step from a fully opened state to a fully closed state, after the elapse of a preset time. This corresponds to the case <2> or <3> in FIG. 2 or the embodiment in which the variable nozzle is switched from a fully opened state to a fully closed state, at the timing tM. When the opening of the variable nozzle is controlled like the pattern P2, the temperature of the neighborhood of the glow plug decreases with the increase in the supercharging pressure, as shown in FIG. 11B. However, the fluctuation region of the engine rotation stays between the lines L2 and L3 similar to at present. Therefore, immediately after the opening of the variable nozzle is changed, the engine rotation is fluctuated as widely as at present, and then is becoming stable.

When the variable nozzle is switched step by step from a fully closed state to a fully opened state in the above manners, it is impossible to avoid a temperature decrease in the neighborhood of each glow plug which is caused by an inflow of cold air. When the variable nozzle is controlled early, the stability is further worsened. However, even when the variable nozzle is controlled after the elapse of a considerable time, the engine rotation is fluctuated as widely as at present, for a relatively long time.

When the variable nozzle is kept in a fully opened state like the pattern P5 in FIG. 11A, the temperature of the neighborhood of the glow plug does not decrease, and the stability is enhanced, as shown in FIG. 11B. However, a long time is required to displace the engine rotation to the stable region.

As described above, introducing a temperature of a neighborhood of a glow plug as a parameter could clarify the reason why combustion stability is dependent on control timing for a variable nozzle as shown in FIG. 2.

A temperature of a neighborhood of a glow plug is influenced by a temperature of cooling water as well as a temperature of intake air (a temperature of air suctioned into cylinders). When the amount of air introduced into cylinders is increased in response to the increase in a supercharging pressure, a temperature of the combustion end is increased and a temperature of a neighborhood of each glow plug is also increased.

The inventors gradually increased supercharging pressure after the elapse of a preset time by closing a variable nozzle little by little, like the pattern P3 in FIG. 11A. As shown in FIG. 11B, in this case, the temperature of the neighborhood of the glow plug is decreased with the increase in the supercharging pressure, but this degree of the decrease is lower than that in the pattern P2. It was therefore possible to stabilize the engine rotation earlier than the pattern P2.

Moreover, the inventors closed the variable nozzle slowly at the beginning, like the pattern P4 in FIG. 11A. As shown in FIG. 11B, in this case, the temperature of the neighborhood of the glow plug does not decrease within a region between the lines L2 and L3. For this reason, it was possible to stabilize the engine rotation earlier.

It was found that it is possible to stabilize the engine rotation early by controlling the variable nozzle gradually like the pattern P3 or P4, instead of controlling the variable nozzle step by step from a fully opened state to a fully closed state.

Next, a description will be given of a specific control procedure for a variable nozzle.

Figure 12:
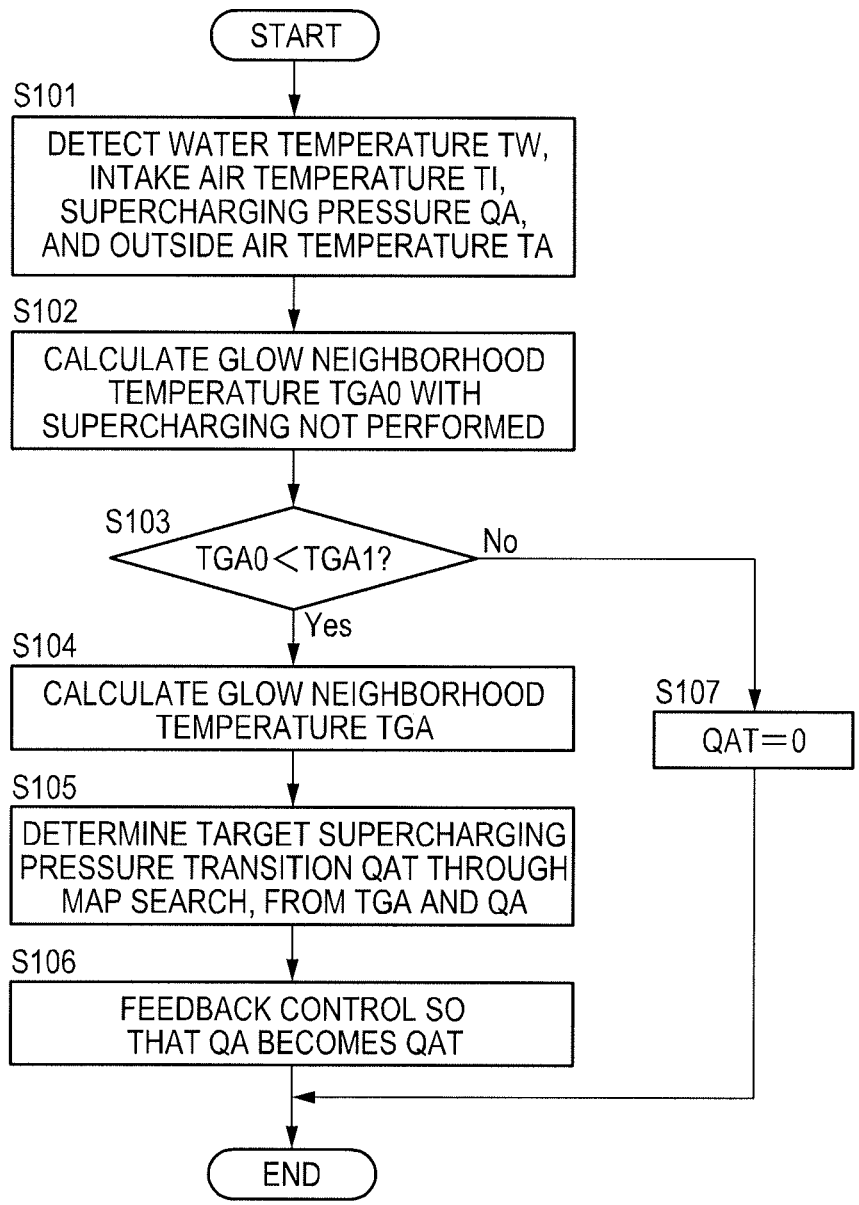
FIG. 12 is a control flowchart in a third embodiment.

FIG. 12 is a control flowchart of a third embodiment.

At Step S101, the controller detects the water temperature TW, the intake air temperature TI, the supercharging pressure QA, and an outside air temperature TA, on the basis of sensor signals.

At Step S102, the controller calculates a temperature of a neighborhood of a glow plug TGA0 when supercharging is not performed, on the basis of an equation described below. In this case, a target surface temperature TGT for the glow plug is preset, and the surface temperature of the glow plug is duty-controlled in such a way that it becomes the target surface temperature, as described above. Therefore, this value is used for the equation.

[Equation 2]

$$TGA0 = TGT + TW \times K1 + TA \times K2 \qquad (2)$$

At Step S103, the controller determines whether or not the temperature of the neighborhood of the glow plug TGA0 is lower than a temperature in the neighborhood of the glow plug TGA1 at which the combustion is stable when supercharging is not performed. If the determination result is "Yes," the controller moves the processing to Step S103. If the determination result is "No," the controller moves the processing to Step S107. The expression "the determination result is No" means that the combustion has become stable without supercharging. In this case, the controller moves the processing to Step S107, then sets a target supercharging pressure QAT to 0, and does not perform supercharging. Otherwise, the combustion will not become stable without supercharging. The controller accordingly moves the processing to Step S103, and sets the target supercharging pressure QAT.

At Step S104, the controller calculates the temperature for the neighborhood of the glow plug TGA, on the basis an equation described below.

[Equation 3]

$$TGA = TGT + TW \times K1 + TI \times K2 \qquad (3)$$

At Step S105, the controller sets the target supercharging pressure QAT through a map search, from the temperature of the neighborhood of the glow plug TGA and the supercharging pressure QA. The specific procedure will be described later.

At Step S106, the controller performs feedback control in such a way that the supercharging pressure QA becomes the target supercharging pressure QAT.

Figure 13A:
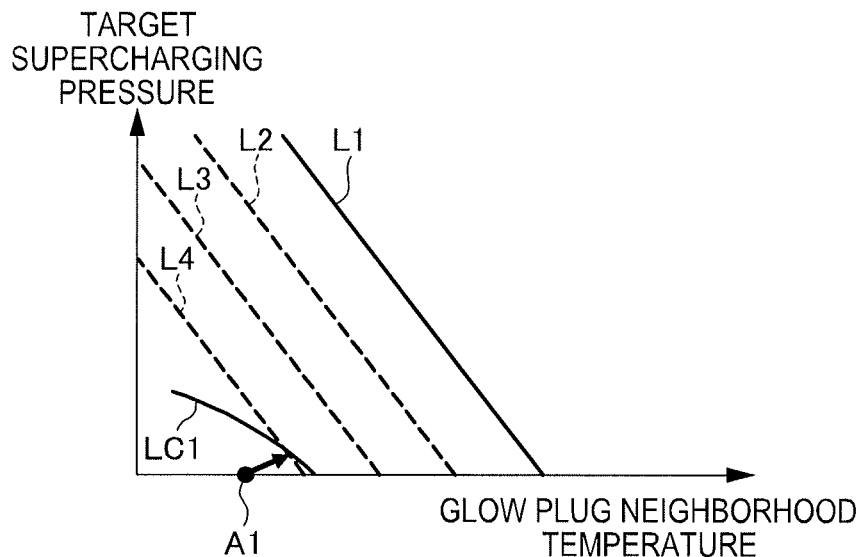
FIG. 13A is an explanatory view of a map search at Step S105.
Figure 13B:
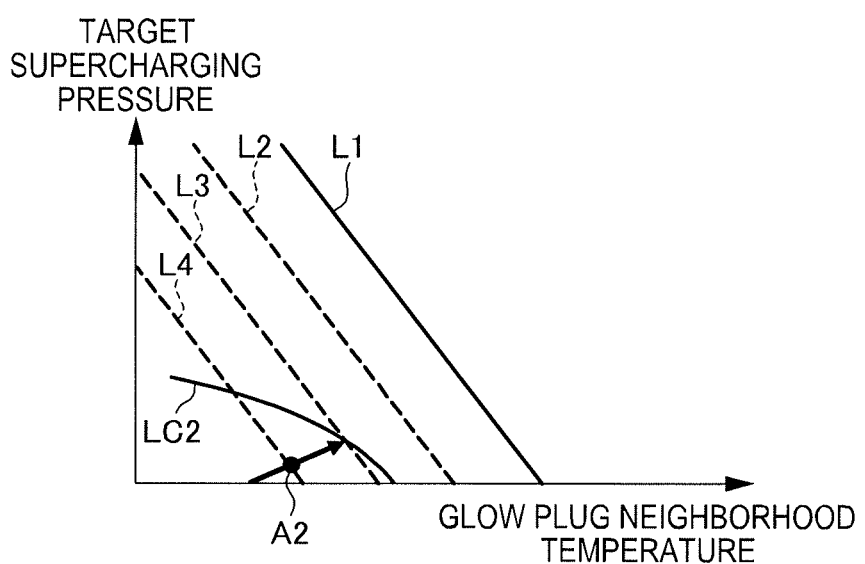
FIG. 13B is an explanatory view of the map search at Step S105.

FIGS. 13A and 13B are explanatory views of the map search at Step S105. The maps in FIGS. 13A and 13B are preset, and the same as that in FIG. 10, for example.

An initial state is assumed to be at A1. Then, the estimation line traced over a preset time is determined like LC1. Any control is possible as long as the above relationship is located on the line LC1. In order to improve the combustion stability performance, however, it is necessary to locate the relationship on the right side of the line L4 that separates rotational fluctuation areas. In addition, it is necessary to make the supercharging pressure as high as possible. This enables the combustion to be stabilized earlier, because as a supercharging pressure increases, a temperature of a neighborhood of each glow plug increases. Therefore, the point of the intersection of the lines L4 and LC1 is set as the target supercharging pressure. In this case, the target supercharging pressure may be set on the right of the line L4 or above the line LC1 instead of the point of the intersection of the lines L4 and LC1, in consideration of the degree of accuracy, a variation, and the like.

When the relationship becomes A2, the estimation line over the preset time since then is determined again like LC2. Then, the point of (or adjoining) the intersection of the lines L3 and LC2 is set likewise as the target supercharging pressure.

Figure 14:
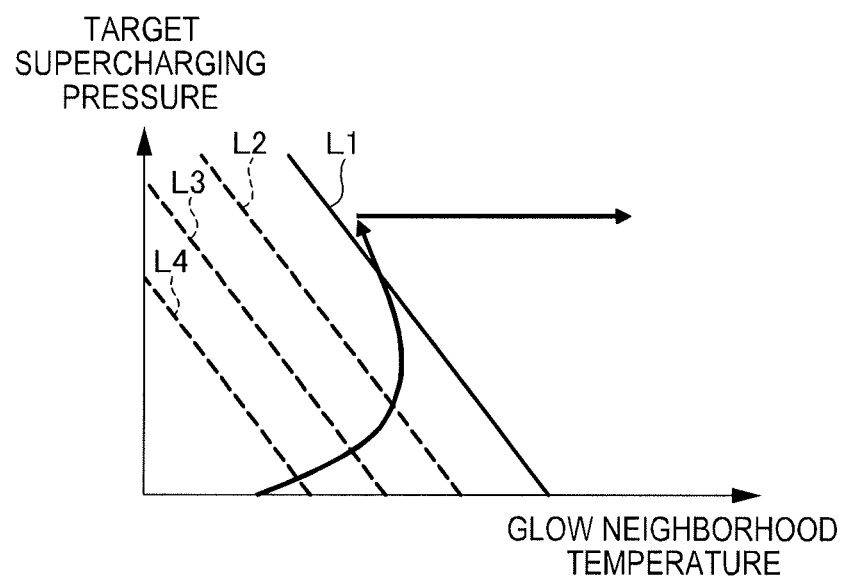
FIG. 14 is a view showing a target supercharging pressure that is set through the map search.

Through a successive repeat of the above procedure, the target supercharging pressure is repeatedly set, as shown in FIG. 14.

As described above, according to this embodiment, the control is performed such that a temperature of a neighborhood of each glow plug does not decrease, not to increase a supercharging pressure step by step. This makes it possible to suppress a decrease in a temperature of a neighborhood of each glow plug and to increase an equivalent ratio of the neighborhood of each glow plug. Consequently, it is possible to make an early transition to a stable idle operation.
(Fourth Embodiment)

Figure 15:
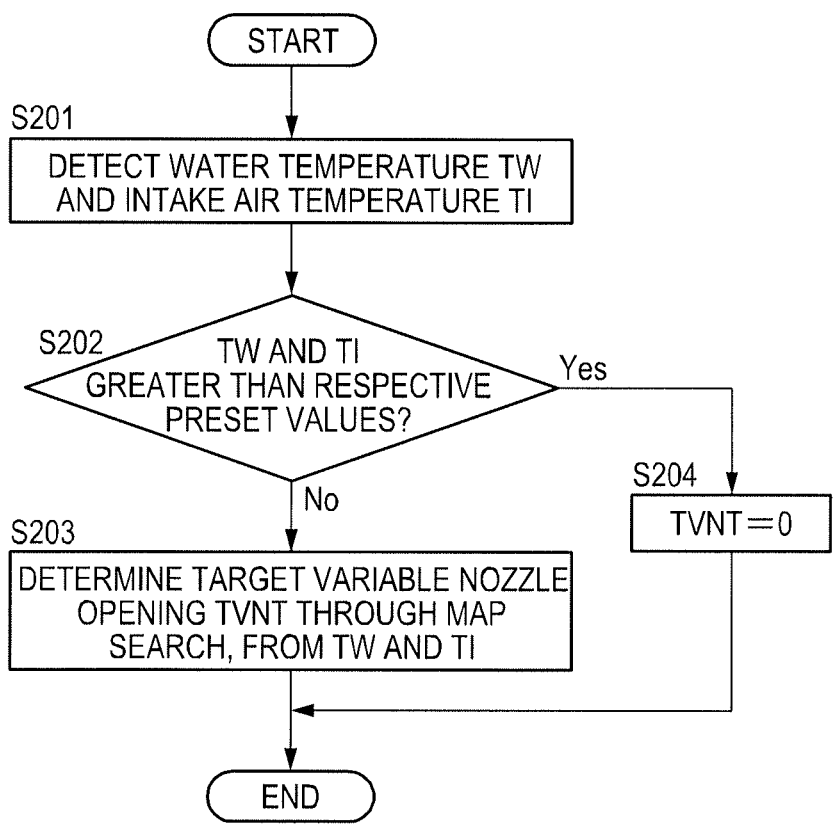
FIG. 15 is a control flowchart in a fourth embodiment.

FIG. 15 is a control flowchart of a fourth embodiment.

In the third embodiment, a target supercharging pressure is set while a state is successively estimated after the elapse of a preset time. In other words, a target supercharging pressure is set while details of a map are successively determined. However, the prevent invention is not limited to this method. The fourth embodiment will be described regarding a case where a map fixed in advance is used.

At Step S201, the controller detects the water temperature TW and the intake air temperature TI, on the basis of sensor signals.

At Step S202, the controller determines whether or not the water temperature TW and the intake air temperature TI are greater than respective preset values. If the determination result is "No," the controller moves the processing to Step S203. If the determination result is "Yes," the controller moves the processing to Step S204.

At Step S203, the controller sets a target variable nozzle opening TVNT through a map search using the water temperature TW and the intake air temperature TI. A specific procedure therefor will be described later.

At Step S204, the controller sets the target variable nozzle opening TVNT to 0, and does not perform supercharging.

Figure 16:
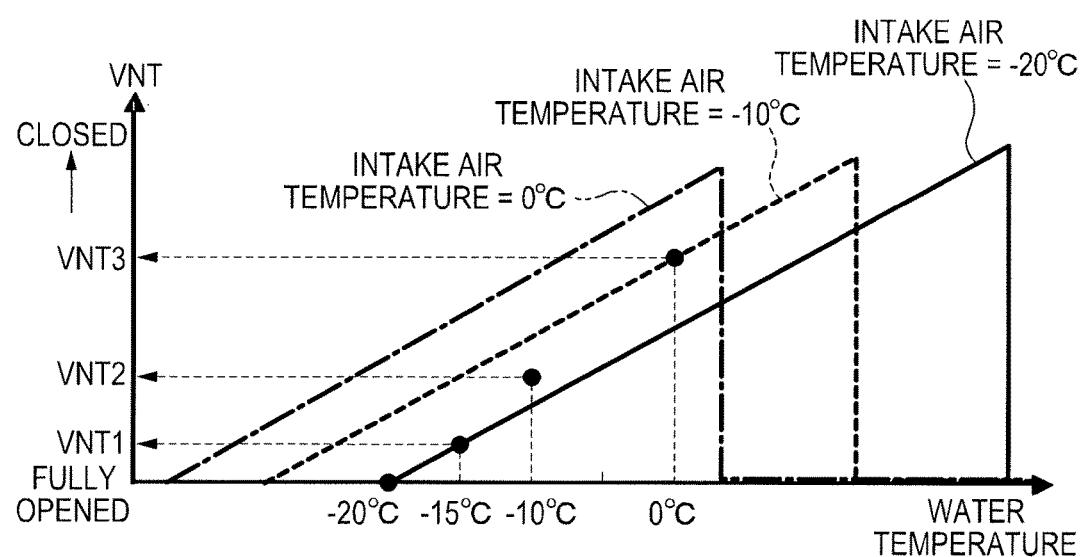
FIG. 16 is an explanatory view of a map search at Step S203.

FIG. 16 is an explanatory view of the map search at Step S203.

Suppose an initial water temperature and an initial intake air temperature are each −20° C. In this case, the target variable nozzle opening is set to 0 (fully opened state) on the basis of FIG. 16.

When the water temperature increases to −15° C. but the intake air temperature is still −20° C., the target variable nozzle opening is set to VNT1.

When the water temperature becomes −10° C. and the intake air temperature becomes −15° C., the target variable nozzle opening is set to VNT2.

When the water temperature becomes 0° C. and the intake air temperature becomes −10° C., the target variable nozzle opening is set to VNT3.

In this way, the fourth embodiment controls the opening of a variable nozzle by using a map fixed in advance.

As described above, this embodiment can also make an early transition to a stable idle operation, and perform the control easily by using a map fixed in advance.
(Fifth Embodiment)

Figure 17A:
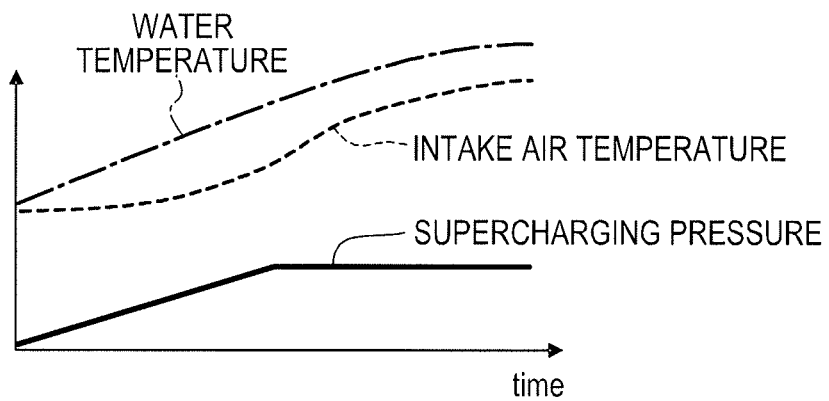
FIG. 17A is an explanatory view of a basic concept of a fifth embodiment.
Figure 17B:
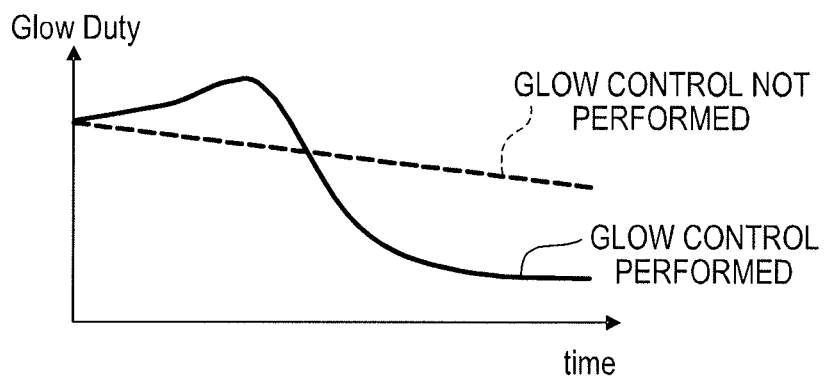
FIG. 17B is an explanatory view of the basic concept of the fifth embodiment.
Figure 17C:
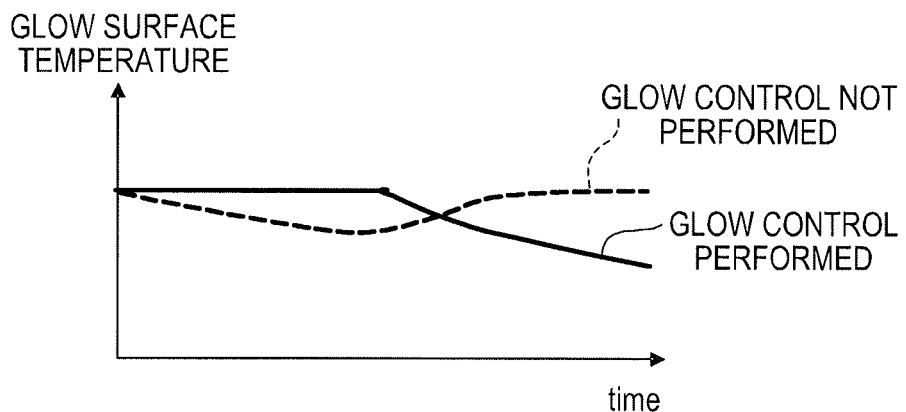
FIG. 17C is an explanatory view of the basic concept of the fifth embodiment.

FIGS. 17A to 17C are explanatory views of a basic concept of a fifth embodiment.

First, the basic concept will be described with reference to FIGS. 17A to 17C, for the purpose of facilitating an understanding of the fifth embodiment.

In this embodiment, as shown in FIG. 17A, the supercharging pressure increases over time. Then, when reaching a target supercharging pressure, the supercharging pressure is kept as it is. In this case, both the water and the intake air temperatures increase over time.

For glow plugs, a target temperature is preset. For example, it may be set to 1200° C. or the like. In order to accomplish this, a duty ratio is normally controlled in such a way that it is initially high and then gradually decreased, as shown in FIG. 17B. This is because without this control, the surface temperature of the glow plugs excessively increases, leading to a shortened lifetime of the glow plugs.

Typical duty control, however, does not consider a change in a supercharging pressure. Accordingly, the surface temperature of the glow plugs in fact decreases with the increase in the supercharging pressure, as shown in FIG. 17C. When the temperature of the glow plugs decreases, a time required for the combustion to become stable is extended in proportion to this temperature decrease.

The fifth embodiment devises the duty control over the glow plugs. A specific procedure therefor will be described below.

Figure 18:
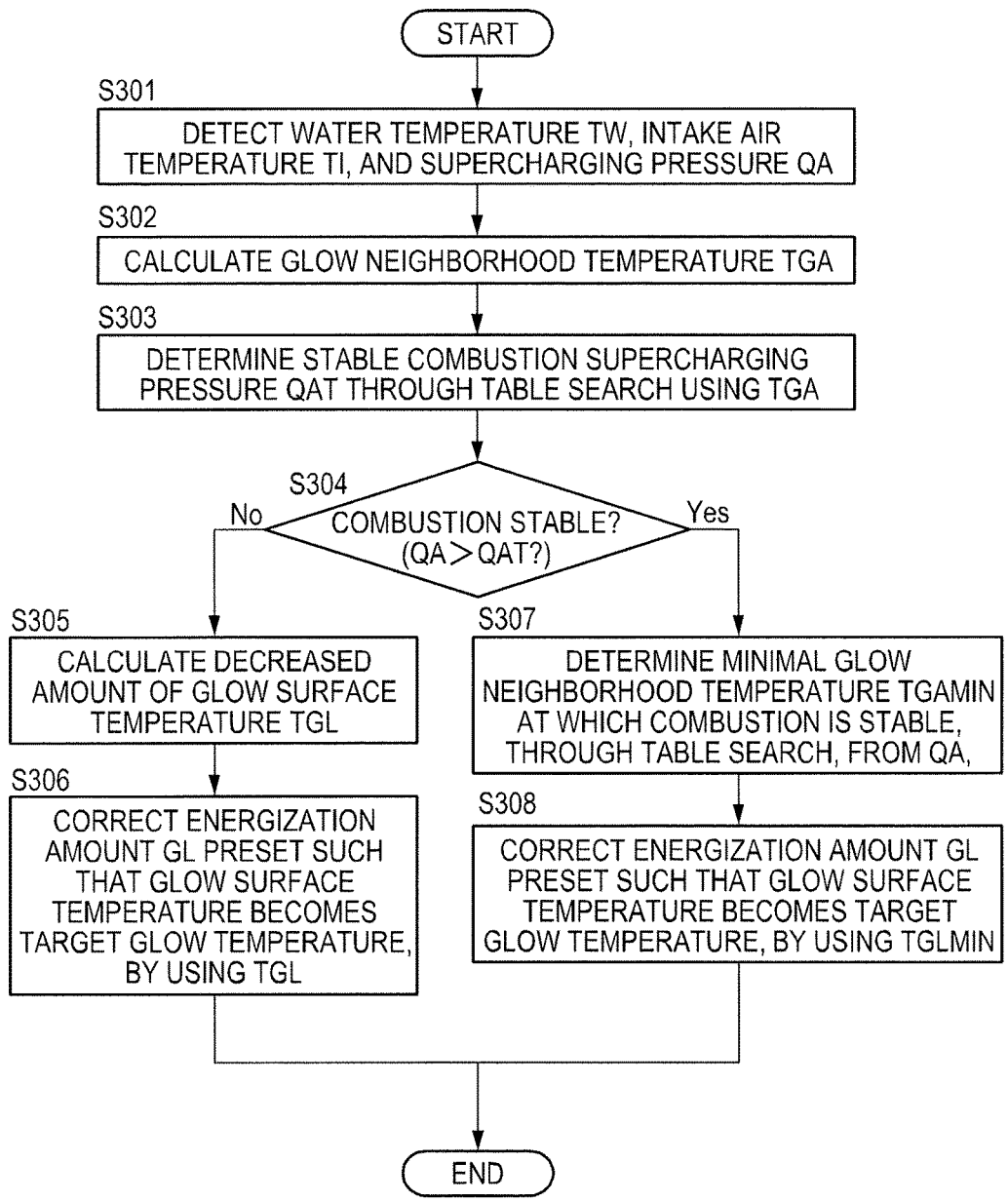
FIG. 18 is a control flowchart in the fifth embodiment.

FIG. 18 is a control flowchart of a fifth embodiment.

At Step S301, the controller detects the water temperature TW, the intake air temperature TI, and the supercharging pressure QA, on the basis of sensor signals.

At Step S302, the controller calculates a temperature in a neighborhood of a glow plug TGA, on the basis of an equation described below. In this equation, TGT denotes a target surface temperature (e.g., 1200° C.) for the glow plug.

[Equation 4]

$$TGA = TGT + TW \times K1 + TI \times K2 \qquad (4)$$

At Step S303, the controller determines a stable combustion supercharging pressure QAT in relation to the temperature in the neighborhood of the glow plug TGA. Specifically, the stable combustion supercharging pressure QAT may be determined with reference to a preset table or the like.

At Step S304, the controller determines whether or not the combustion is stable, more specifically, whether or not the supercharging pressure QA is higher than the stable combustion supercharging pressure QAT. If the determination result is "No," the controller moves the processing to Step S305. If the determination result is "Yes," the controller moves the processing to Step S307.

At Step S305, the controller determines a decreased amount of the surface temperature of the glow plug TGL. Specifically, for example, the decreased amount TGL may be determined on the basis of an equation described below. In this equation, the coefficients K3 and K4 may be set as appropriate.

[Equation 5]

$$TGL = TW \times K3 + (TI \times QA) \times K4 \tag{5}$$

At Step S306, the controller corrects an energization amount GL0 that has been preset such that the surface temperature of the glow plug becomes a target surface temperature, by using the decreased amount of the surface temperature of the glow plug TGL. Specifically, for example, the energization amount for the glow plug GL may be set on the basis of an equation described below. In this equation, the coefficient K5 may be set as appropriate.

[Equation 6]

$$GL = GL0 + TGL \times K5 \tag{6}$$

At Step S307, the controller determines a minimal temperature value TGAMIN for the neighborhood of the glow plug at which the combustion is stable, from the supercharging pressure QA. That is, for example, the minimal temperature value TGAMIN for the neighborhood of the glow plug may be determined with reference to a preset table.

At Step S308, the controller corrects the energization amount GL0 that has been preset such that the surface temperature of the glow plug becomes the target surface temperature, by using a minimal temperature TGAMIN. Specifically, for example, an energization amount for the glow plug GL may be determined as an equation described below. In this equation, the coefficient K6 may be set as appropriate.

[Equation 7]

$$GL = GL0 - TGAMIN \times K6 \tag{7}$$

In this way, as shown in FIG. 17B, the energization amount (duty ratio) for the glow plug is increased over an initial period in which the combustion is unstable. Therefore, even when supercharging is performed, a decrease in the surface temperature of the glow plug is suppressed (FIG. 17C).

After the combustion has become stable, the energization amount (duty ratio) for the glow plug is decreased, as shown in FIG. 17B. As a result, the surface temperature for the glow plug decreases, but the temperature of the neighborhood of the glow plug at which the combustion is stable is ensured. Furthermore, since the energization amount (duty ratio) for the glow plug is decreased after the combustion has become stable, it is decreased in total. Consequently, it is possible to lighten a load on glow plugs, extending their lifetime.

Figure 19:
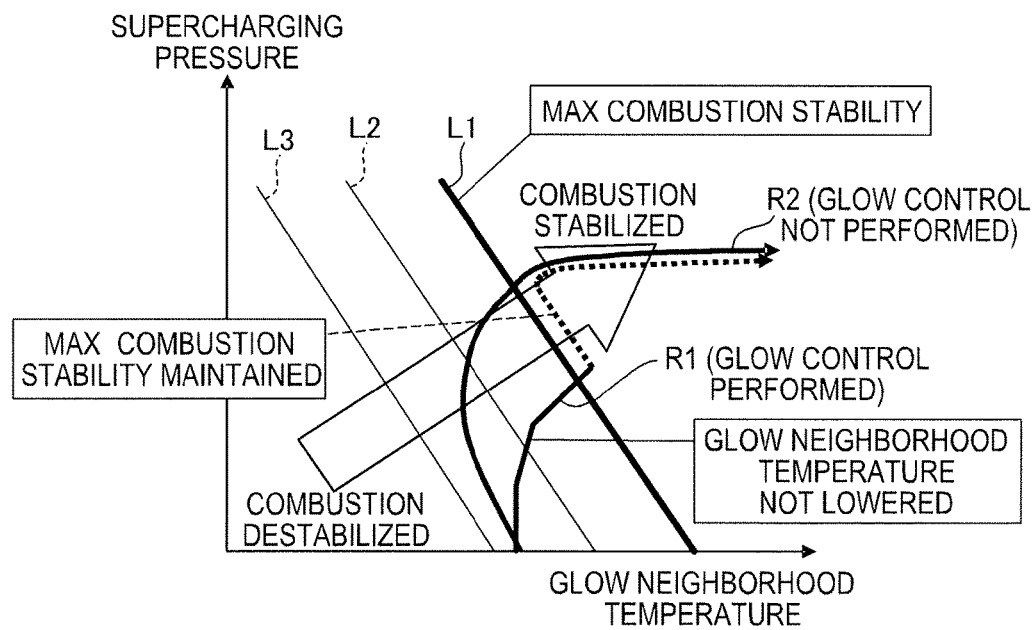
FIG. 19 is an explanatory view of a function and effect of the fifth embodiment.

FIG. 19 is an explanatory view of an effect and function of the fifth embodiment.

According to the fifth embodiment above, the energization amount (duty ratio) for the glow plugs is increased over an initial period in which the combustion is unstable. The surface temperature of the glow plugs is therefore suppressed from decreasing, even when supercharging is performed. In this case, the relationship between a temperature of a neighborhood of a glow plug and a supercharging pressure follows a solid line like a route R1 in FIG. 19. After the combustion has become stable, or after the above relationship enters a stable combustion region on the right side of the line L1, the control is performed in such a way that the relationship traces the line L1. Performing the control in this manner enables an early transit to a stable idle operation.

After the combustion has become stable, the water temperature increases, and the intake air temperature also increases due to the supercharging. Therefore, even when the surface temperature for the glow plugs is decreased, the temperature of the neighborhood of the glow plugs can be maintained, so that the combustion is stable. This embodiment decreases the energization amount (duty ratio) for the glow plugs, decreasing the total energization amount for the glow plugs. This lightens a load on the glow plugs, extending their lifetime.

Up to this point, the embodiments of the present invention have been described. However, these embodiments have exemplified some applications of the present invention, and are not intended to limit the technical scope of the present invention to the specific configurations in the embodiments described above.

In the above description, for example, a temperature of a neighborhood of a glow plug is calculated from a surface temperature of the glow plug, a temperature of cooling water TW, and a temperature of intake air TI. However, this calculation method is not limited to the above. A temperature of lubricating oil, a temperature of a wall surface of a cylinder, an air excess rate, the amount of intake air, an air density, and a supercharging pressure may also be considered. In this case, it is only necessary to define some additional coefficients as appropriate, and add them to the equation (1). Alternatively, a temperature of a neighborhood of a glow plug may be calculated on the basis of one of the parameters, in a simplified manner. Thus, it may be determined which of the parameters is used, as appropriate in consideration of a required accuracy, the cost of a controller, and the like.

In the above description, the supercharging pressure is controlled by controlling the variable nozzle in a variable nozzle type of turbo charger. However, the supercharging pressure (pressure in cylinders) may be controlled by controlling another supercharger or adjusting valve timing with a variable valve mechanism.

The equations described above are exemplary.

The embodiments described above may be employed in combination as appropriate.

This application claims the priority right based on JP2012-57713 filed with the Japanese Patent Office on Mar. 14, 2012, the entire content of which is incorporated herein by reference.

What is claimed is:

1. A control apparatus for a diesel engine including a glow plug that heats an interior of a cylinder of the engine upon engine startup, and an intake air quantity adjusting device that adjusts an intake air quantity of the engine, the control apparatus comprising;

an intake air quantity control device configured to control the intake air quantity adjusting device so that in an idle operation immediately after the engine startup from a cold condition as determined by a timer, the intake air quantity of the engine is set by the intake air quantity adjusting device to a first target amount at a beginning of the idle operation, and after a set period of time has elapsed from start of the idle operation as determined from the timer, the intake air quantity is set by the intake air quantity adjusting device to a second target amount greater than the first target amount, wherein the intake air quantity control device extends the set period of time as a cooling water temperature of the engine detected by a water temperature sensor at the engine startup decreases to a temperature below 0° C.

2. The control apparatus according to claim 1, wherein the intake air quantity adjusting device includes a supercharger arranged to be capable of changing a supercharging pressure of the engine.

3. The control apparatus according to claim 2, wherein the intake air quantity control device controls the supercharger so that the supercharger generates a first supercharging pressure when the intake air quantity is adjusted to the first amount, and a second supercharging pressure when. the intake air quantity is adjusted to the second amount.

4. A control apparatus for a diesel engine including a glow plug that heats an interior of a cylinder of the engine upon engine startup, and an intake air quantity adjusting section that adjusts an intake air quantity of the engine, the control apparatus comprising:

an intake air quantity control section configured to control the intake air quantity adjusting section so that in an idle operation immediately after the engine startup the intake air quantity of the engine is adjusted to a first amount at a beginning of the idle operation, and after a predetermined period of time has elapsed from start of the operation, the intake air quantity is adjusted to a second amount greater than the first amount, wherein the intake air quantity control section extends the predetermined period of time as a cooling water temperature of the engine at the engine startup decreases, wherein the intake air quantity adjusting section includes a supercharger arranged to be capable of changing a supercharging pressure of the engine, wherein the intake air quantity control section controls the supercharger so that the supercharger generates a first supercharging pressure when the intake air quantity is adjusted to the first amount, and a second supercharging pressure when the intake air quantity is adjusted to the second amount, wherein the supercharger includes a variable nozzle that changes the supercharging pressure through changing an opening of the nozzle; and wherein the intake air quantity control section initially fully opens the variable nozzle at the beginning of the idle operation, and fully closes the variable nozzle after the predetermined period of time has elapsed from the start of the idle operation.

* * * * *